US012632041B2

(12) United States Patent
Iwaki et al.

(10) Patent No.: US 12,632,041 B2
(45) Date of Patent: May 19, 2026

(54) INFORMATION PROCESSING APPARATUS, INFORMATION PROCESSING METHOD, AND COMPUTER READABLE STORAGE MEDIUM STORING PROGRAM

(71) Applicant: MAX CO., LTD., Tokyo (JP)

(72) Inventors: Kozo Iwaki, Tokyo (JP); Norihiro Nagai, Tokyo (JP); Takahiro Hashimoto, Tokyo (JP); Yasuhisa Arabiki, Tokyo (JP); Sadayoshi Takeuchi, Tokyo (JP)

(73) Assignee: Max Co., Ltd., Tokyo (JP)

( * ) Notice: Subject to any disclaimer, the term of this patent is extended or adjusted under 35 U.S.C. 154(b) by 432 days.

(21) Appl. No.: 18/131,972

(22) Filed: Apr. 7, 2023

(65) Prior Publication Data

US 2023/0324887 A1 Oct. 12, 2023

(30) Foreign Application Priority Data

Apr. 8, 2022 (JP) ................................. 2022-064770

(51) Int. Cl.
G05B 19/418 (2006.01)
G05B 19/4093 (2006.01)
(52) U.S. Cl.
CPC ... G05B 19/4183 (2013.01); G05B 19/40932 (2013.01); *G05B 2219/50185* (2013.01)
(58) Field of Classification Search
None
See application file for complete search history.

(56) References Cited

U.S. PATENT DOCUMENTS 8,766,794 B2 * 7/2014 Ferguson ............. G06Q 20/204
340/539.11
9,467,862 B2 * 10/2016 Zeiler ................... H04W 4/029
(Continued)

FOREIGN PATENT DOCUMENTS

EP 1855262 B1 4/2013
JP 2009-258983 A 11/2009
(Continued)

OTHER PUBLICATIONS

Mahesh, Bhargav, and Muhammad Umer. "Smart Connected Power Tools: An Industrial Implementation of Event Driven Architecture." (2017). (Year: 2017).*

(Continued)

*Primary Examiner* — Carlos R Ortiz Rodriguez
(74) *Attorney, Agent, or Firm* — Banner & Witcoff, Ltd.

(57) ABSTRACT
An information processing apparatus includes processing circuitry configured to: acquire, from each of a plurality of electric power tools, position information of each of the plurality of electric power tools and actuation information indicating that each of the plurality of electric power tools is actuated; generate work information indicating a work status of each of the plurality of electric power tools based on the actuation information, the work status including a actuation history of each of the plurality of the electric power tools; receive designation of a region; extract, from among the plurality of electric power tools, an electric power tool of which the position information is included in the designated region; generate display data for causing a display device to display the work information of the extracted electric power tool; and output the display data.

15 Claims, 12 Drawing Sheets

(56)          References Cited

U.S. PATENT DOCUMENTS

| | | | |
|---|---|---|---|
| 10,993,204 B2 * | 4/2021 | Pattabiraman | ...... H04W 64/003 |
| 2003/0074134 A1 | 4/2003 | Shike et al. | |
| 2013/0109375 A1 | 5/2013 | Zeiler et al. | |
| 2015/0161969 A1 | 6/2015 | Zaizen et al. | |
| 2017/0263213 A1 | 9/2017 | Zaizen et al. | |
| 2017/0263214 A1 | 9/2017 | Zaizen et al. | |
| 2022/0022043 A1 | 1/2022 | Zeiler et al. | |

FOREIGN PATENT DOCUMENTS

| | | |
|---|---|---|
| JP | 2013-235485 A | 11/2013 |
| JP | 2017-181107 A | 10/2017 |
| WO | 2020-217493 A1 | 10/2020 |

OTHER PUBLICATIONS

May 14, 2025—(AU) Examination Report No. 1—App 2023202196.
Sep. 1, 2023—(EP) Extended Search Report—App 23167384.9.

\* cited by examiner

41CN: CONNECTING UNIT
42CN: CONNECTING UNIT

SITE 1

SOLUTION

| SOLUTION | THE NUMBER OF BINDING FOR TODAY | THE NUMBER OF BINDING IN THIS WEEK | THE NUMBER OF BINDING AT THIS SITE | MOST RECENT ERROR | MODEL NAME | CURRENT STATUS | ANNOUNCE-MENT |
|---|---|---|---|---|---|---|---|
| NICKNAME a | 0 | 0 | 0 | CONSUMABLE ITEM ERROR | MODEL 1 | WORKING | |
| NICKNAME b | 0 | 0 | 4123 | | MODEL 1 | WORKING | |
| NICKNAME c | 0 | 0 | 26 | | MODEL 2 | WORKING | |
| NICKNAME d | 0 | 2826 | 0 | | MODEL 1 | WORKING | |
| NICKNAME e | 0 | 0 | 0 | OVERDIS-CHARGE ERROR | MODEL 4 | WORKING | |

MACHINE NICKNAME

R22    R23    R24    R25    R26    R27

INFORMATION PROCESSING APPARATUS, INFORMATION PROCESSING METHOD, AND COMPUTER READABLE STORAGE MEDIUM STORING PROGRAM

CROSS-REFERENCE TO RELATED APPLICATIONS

This application is based on and claims priority under 35 USC 119 from Japanese Patent Application No. 2022-064770 filed on Apr. 8, 2022, the entire content of which is incorporated herein by reference.

TECHNICAL FIELD

The present invention relates to an information processing apparatus, an information processing method, and a program.

BACKGROUND ART

In a site where construction work or the like is performed, when a failure occurs in an electric power tool, a work process is delayed. Therefore, a prompt repair is required. In order to solve this problem, there has been a device that displays a position of construction equipment or the electric power tool on a map and displays a state thereof with a color, a shape, or the like of a mark on the map to manage the state of the equipment. For example, JP2009-258983A describes a device that can transmit data to a central control station and can be controlled by the central control station.

However, since a display process in the related art is performed based on error information or the like of the equipment acquired when a problem occurs, when a manager recognized an abnormality, some kind of failure had already occurred, and a possibility of affecting the work process could not be avoided. In order to manage a status of the electric power tool more finely and maintain a state in which the equipment can be immediately used on site, it is necessary to manage a work status of the electric power tool in a timely manner.

An aspect of the present disclosure relates to provide an information processing apparatus, an information processing method, and a computer readable storage medium storing a program that enable easy grasping of a work status of an electric power tool.

SUMMARY OF INVENTION

According to an aspect of the present disclosure, there is provided an information processing apparatus includes processing circuitry configured to: acquire, from each of a plurality of electric power tools, position information of each of the plurality of electric power tools and actuation information indicating that each of the plurality of electric power tools is actuated; generate work information indicating a work status of each of the plurality of electric power tools based on the actuation information, the work status including a actuation history of each of the plurality of the electric power tools; receive designation of a region; extract, from among the plurality of electric power tools, an electric power tool of which the position information is included in the designated region; generate display data for causing a display device to display the work information of the extracted electric power tool; and output the display data.

BRIEF DESCRIPTION OF DRAWINGS

FIG. 10 is a diagram illustrating an example of a work information screen according to the present embodiment;

DESCRIPTION OF EMBODIMENTS

Figure 1:
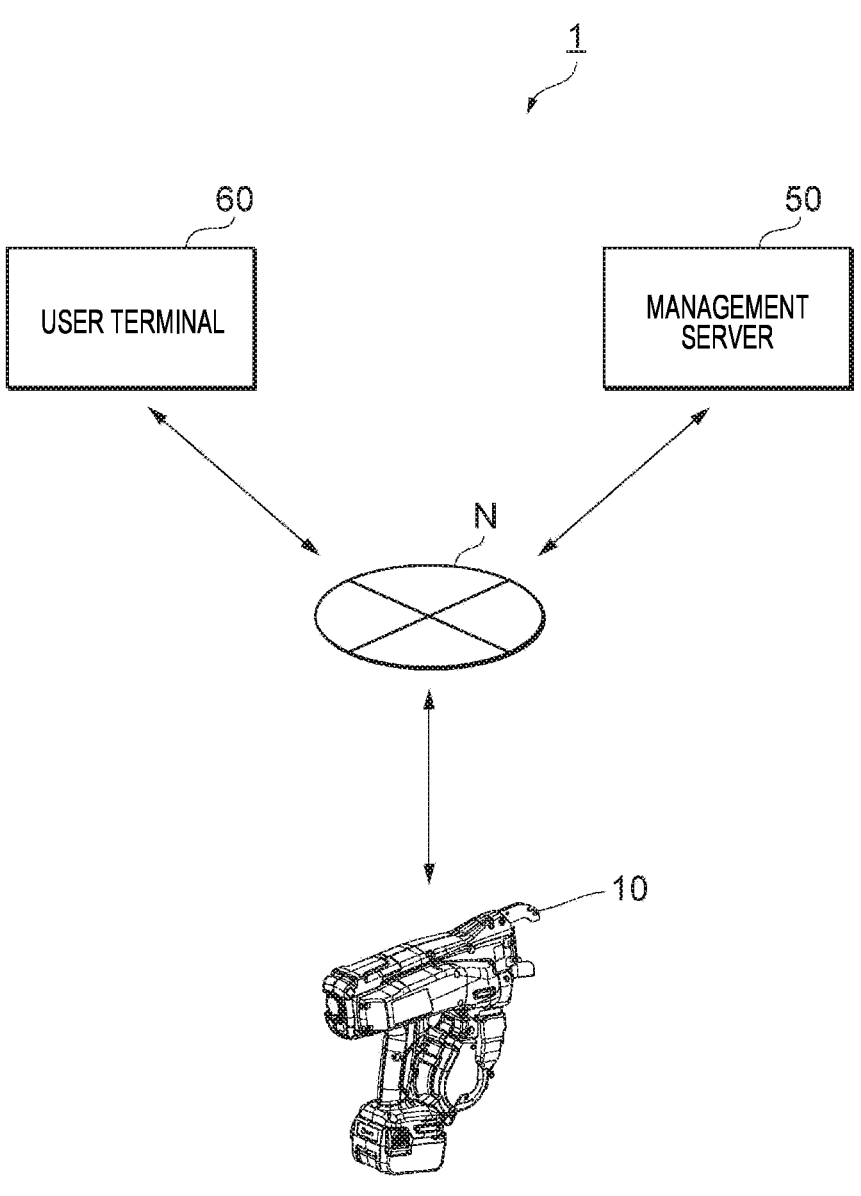
FIG. 1 is a diagram illustrating an example of a schematic configuration of a machine management system 1 according to the present embodiment.

Preferred embodiments of the present invention will be described with reference to the accompanying drawings. (In the drawings, components denoted by the same reference numerals have the same or similar configurations.)

First Embodiment (1) Machine Management System 1

As shown in FIG. 1, a machine management system 1 according to the present embodiment includes a reinforcing bar binding machine 10, a management server 50, and a user terminal 60 that are connected to one another in a manner of transmitting and receiving information to and from one another via a communication network N. The reinforcing bar binding machine 10 is an example of an electric power tool. The present invention is not limited to the reinforcing bar binding machine 10, and can be widely applied to an electric power tool having a communication function and performing work using an electric motor (motor), and can be applied to, for example, a drill, an impact driver, a nailer, a grinder, a reciprocating saw, or a polisher. The motor may be a brushless motor or a brushed motor. Further, the "electric power tool" of the present invention refers to a tool that uses electricity as a power source and is used for work such as machining, and the "electric power tool" of the present invention includes a product used alone and a component or a module constituting a part of another device. For example, the "electric power tool" of the present invention may be a module attached to equipment such as a robot arm. Further, the "electric power tool" of the present invention may be a component constituting a part of a machine tool having a plurality of functions.

The management server 50 is an example of an information processing apparatus that manages various kinds of information related to the reinforcing bar binding machine 10, acquires various kinds of information and the like from the reinforcing bar binding machine 10, stores the information in a predetermined storage unit, generates various kinds of data based on various kinds of information and the like in response to a request from the user terminal 60, and supplies the data to the user terminal 60. The machine management system 1 may include a plurality of user terminals 60. The machine management system 1 may include a plurality of reinforcing bar binding machines 10.

(2) Reinforcing Bar Binding Machine 10

The reinforcing bar binding machine 10 will be described with reference to FIGS. 2 to 4.

Figure 2:
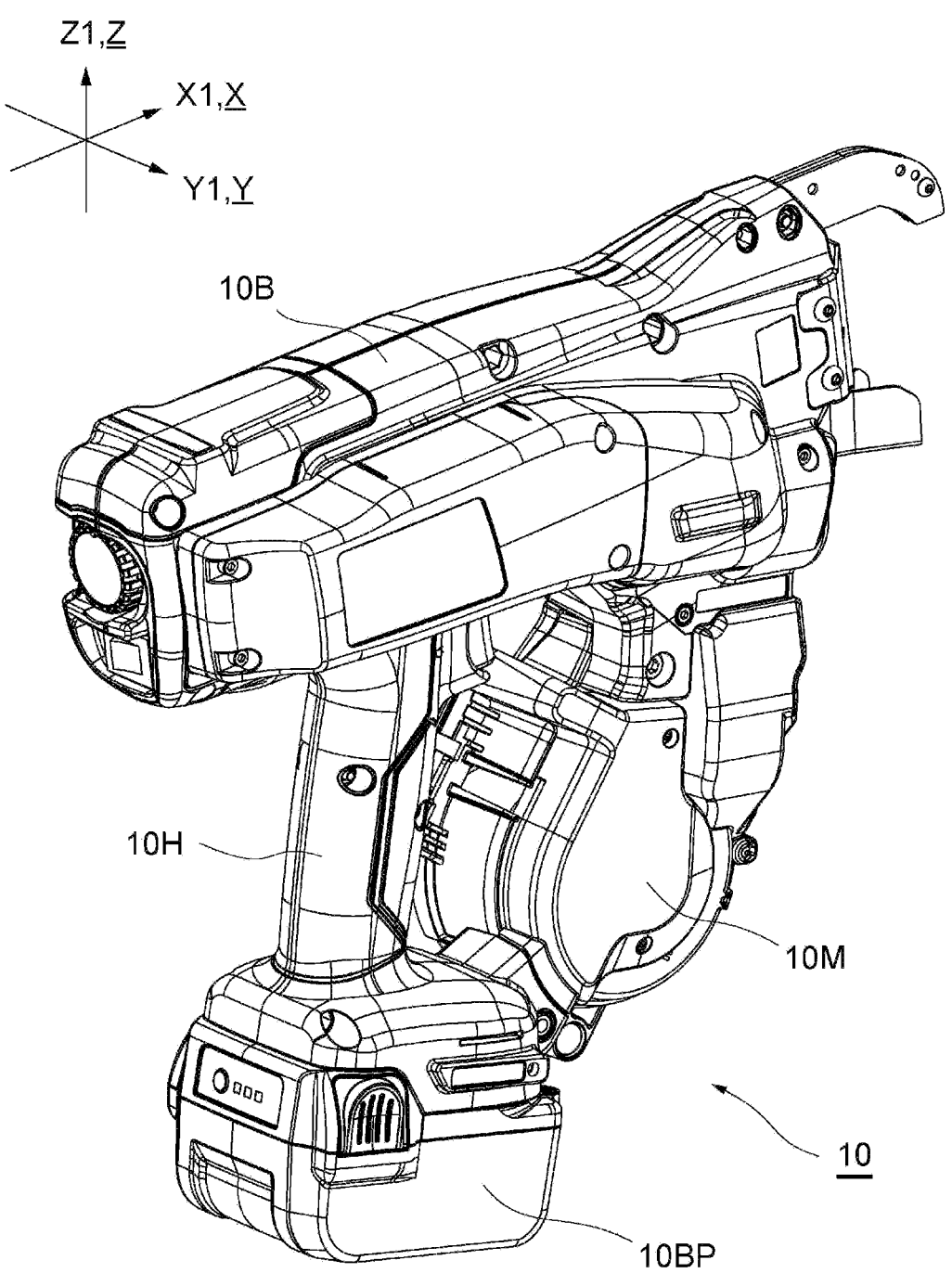
FIG. 2 is a perspective view of a reinforcing bar binding machine 10 according to the present embodiment.
Figure 3:
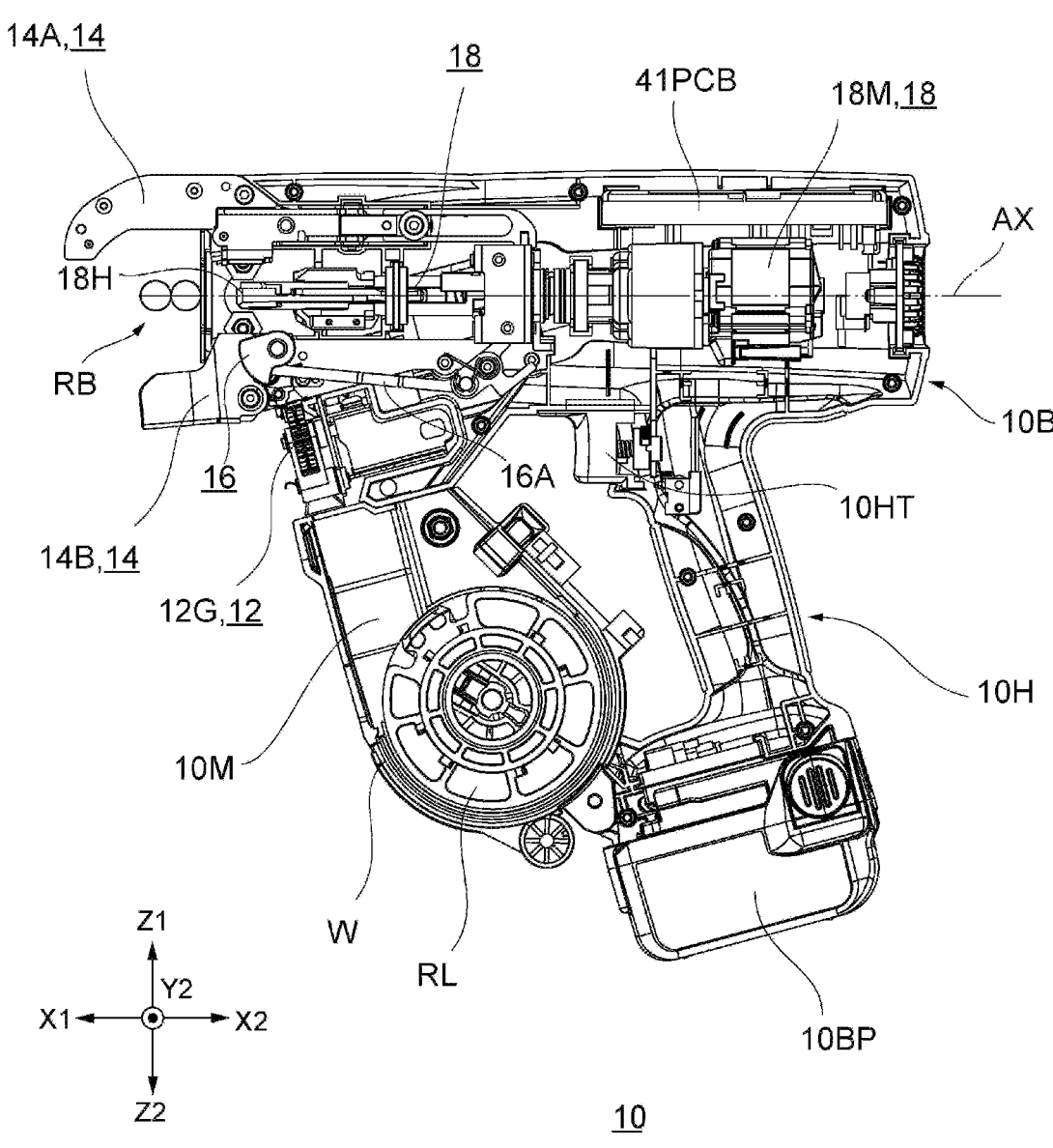
FIG. 3 is a cross-sectional view of the reinforcing bar binding machine 10 according to the present embodiment.

FIG. 2 is a perspective view of the reinforcing bar binding machine 10 which is the electric power tool according to the present embodiment, and FIG. 3 is a cross-sectional view of the electric power tool taken along a cross-section perpendicular to a left-right direction Y of the reinforcing bar binding machine 10. For the sake of convenience, a left-right direction on the paper of FIG. 3 may be referred to as a front-rear direction X, in particular, a leftward direction on the paper may be referred to as a front side X1, and a rightward direction on the paper may be referred to as a rear side X2, an upper-lower direction on the paper may be referred to as an upper-lower direction Z, in particular, an upward direction on the paper may be referred to as an upper side Z1, and a downward direction on the paper may be referred to as a lower side Z2, a direction perpendicular to the front-rear direction X and the upper-lower direction Z may be referred to as the left-right direction Y, in particular, a rightward direction may be referred to as a right side Y1, and a leftward direction may be referred to as a left side Y2 when facing the front side X1. These are used for the purpose of illustrating a relative direction relationship, and do not indicate an absolute direction.

The reinforcing bar binding machine 10 according to the present embodiment is capable of binding two reinforcing bars RB or three or more reinforcing bars RB by feeding a wire W outward from an end portion thereof at the front side X1.

Specifically, the reinforcing bar binding machine 10 includes a handle 10H which is gripped by a worker, a magazine 10M that accommodates the wire W, a wire feeding portion 12 that feeds the wire W outward from the end portion of the front side X1, a curl forming portion 14 that constitutes a traveling path of the wire W for winding the wire W around the reinforcing bar RB, a cutting portion 16 that cuts the wire W wound around the reinforcing bar RB, a binding portion 18 that twists the wire W wound around the reinforcing bar RB, a tool control portion including a driving control unit 22 that controls a feeding motor 12M and a binding motor 18M respectively provided in the wire feeding portion 12 and the binding portion 18, and a communication portion 30 that includes a communicator 32 that allows the reinforcing bar binding machine 10 to communicate with an outside and a communication control unit 34 that controls the communicator 32.

In the reinforcing bar binding machine 10 of the present embodiment, the curl forming portion 14, the cutting portion 16, the binding portion 18, the tool control portion, and the communication portion 30 constitute a main body portion 10B of the reinforcing bar binding machine 10. The magazine 10M is provided in a manner of extending from a lower portion of the main body portion 10B on the front side X1 to the lower side Z2. The handle 10H is provided in a manner of extending from a lower portion of the main body portion 10B on the rear side X2 to the lower side Z2. Accordingly, the magazine 10M is provided at the front side X1 with respect to the handle 10H, and the handle 10H is provided at the rear side X2 with respect to the magazine 10M. Further, a lower portion of the magazine 10M and a lower portion of the handle 10H are connected to each other. Hereinafter, each configuration will be described.

The reinforcing bar binding machine 10 includes the handle 10H that extends from the main body portion 10B to the lower side Z2. The handle 10H corresponds to a portion for gripping the reinforcing bar binding machine 10 by a worker. A lower end of the handle 10H is formed such that a main battery 10BP can be detachably attached thereto. A trigger 10HT is provided on a surface of the handle 10H facing the front side X1. The reinforcing bar binding machine 10 is configured such that when the worker presses the trigger 10HT toward the rear side X2, the tool control portion starts a control operation to start a binding work as will be described later.

In the magazine 10M, a reel RL around which the linear wire W is wound is rotatably and detachably housed. Here, the reel RL is configured to feed one wire W or to simultaneously feed a plurality of wires W. The wire W is a linear body suitable for binding a long metal wire (including a coated metal wire) having flexibility, and the reinforcing bar RB.

The wire feeding portion 12 includes a pair of gears 12G configured to advance the wire W by rotating in mutually different directions from each other with the wire W sandwiched therebetween, and the feeding motor 12M (an example of the "electric motor") that drives the gear 12G. The feeding motor 12M includes a rotor and a stator. The wire feeding portion 12 is configured to feed the wire W outward by rotating the rotor of the feeding motor 12M in a forward direction and pull back the wire W by rotating the rotor in a backward direction. The tool control portion that controls the feeding motor 12M of the wire feeding portion 12 will be described later.

The curl forming portion 14 includes a curl guide 14A that bends the wire W sent by the wire feeding portion 12 to curl the wire W, and an induction guide 14B that guides the wire W that has been curled by the curl guide 14A to the binding portion 18. The curl guide 14A is capable of bending the wire W into a loop shape by advancing the wire W along an inner wall surface. Therefore, the wire W can be wound around the reinforcing bars RB by feeding the wire W in a state in which the plurality of reinforcing bars RB are disposed in a manner of extending in the left-right direction Y in a space between the curl guide 14A and the induction guide 14B.

The cutting portion 16 includes a fixed blade, a movable blade that cuts the wire W in cooperation with the fixed blade, and a transmission mechanism 16A that transmits an operation of the binding portion 18 to the movable blade. The cutting portion 16 is capable of cutting the wire W by a rotation operation of the movable blade with the fixed blade as a fulcrum shaft. The transmission mechanism 16A is configured to transmit the operation of the binding portion 18 to the movable blade, and configured to rotate the movable blade portion in conjunction with a binding operation performed by the binding portion 18. Therefore, the transmission mechanism 16A rotates the movable blade in conjunction with the operation of the binding portion 18, thereby cutting the wire W at a predetermined timing as will be described later.

The binding portion 18 includes a pair of hooks 18H that is openable and closable in order to clamp the wire W, a rotation shaft that rotates the pair of hooks 18H with the front-rear direction X as a rotation axis, a speed reducer that moves the rotation shaft in a direction of the rotation axis (front-rear direction X) and rotates the rotation shaft that has moved to the front side X1, and the binding motor 18M that is rotatable based on a rotation axis AX.

The rotation shaft of the binding portion 18 rotates in a forward direction by rotating the binding motor 18M in the forward direction. A sliding portion is provided around the rotation shaft, and is movable to the front side X1 by forward rotation of the rotation shaft. The wire W fed out by the feeding motor 12M in a state in which the pair of hooks 18H are opened advances while curving along inner wall surfaces of the curl guide 14A and the induction guide 14B, and a tip of the wire W passes through a gap between the pair of opened hooks 18H. In this state, when the binding motor 18M rotates in the forward direction and the rotation shaft rotates in the forward direction, the sliding portion moves toward the front side X1, and the pair of hooks 18H are closed. Therefore, the pair of hooks 18H are capable of clamping the wire W. When the binding motor 18M further rotates in the forward direction and the rotation shaft rotates in the forward direction to move the sliding portion to the front side X1, the movable blade is rotated by the transmission mechanism 16A to cut the wire W. When the binding motor 18M further rotates in the forward direction, the binding portion 18 bends the tip of the cut wire W in a state in which the wire W is clamped by the pair of hooks 18H. When the binding motor 18M further rotates in the forward direction, the rotation shaft rotates together with the sliding portion with the front-rear direction X as the rotation axis. The rotation shaft rotates in the state in which the wire W is clamped by the pair of hooks 18H, whereby the pair of hooks 18H twist the wire W.

Figure 4:
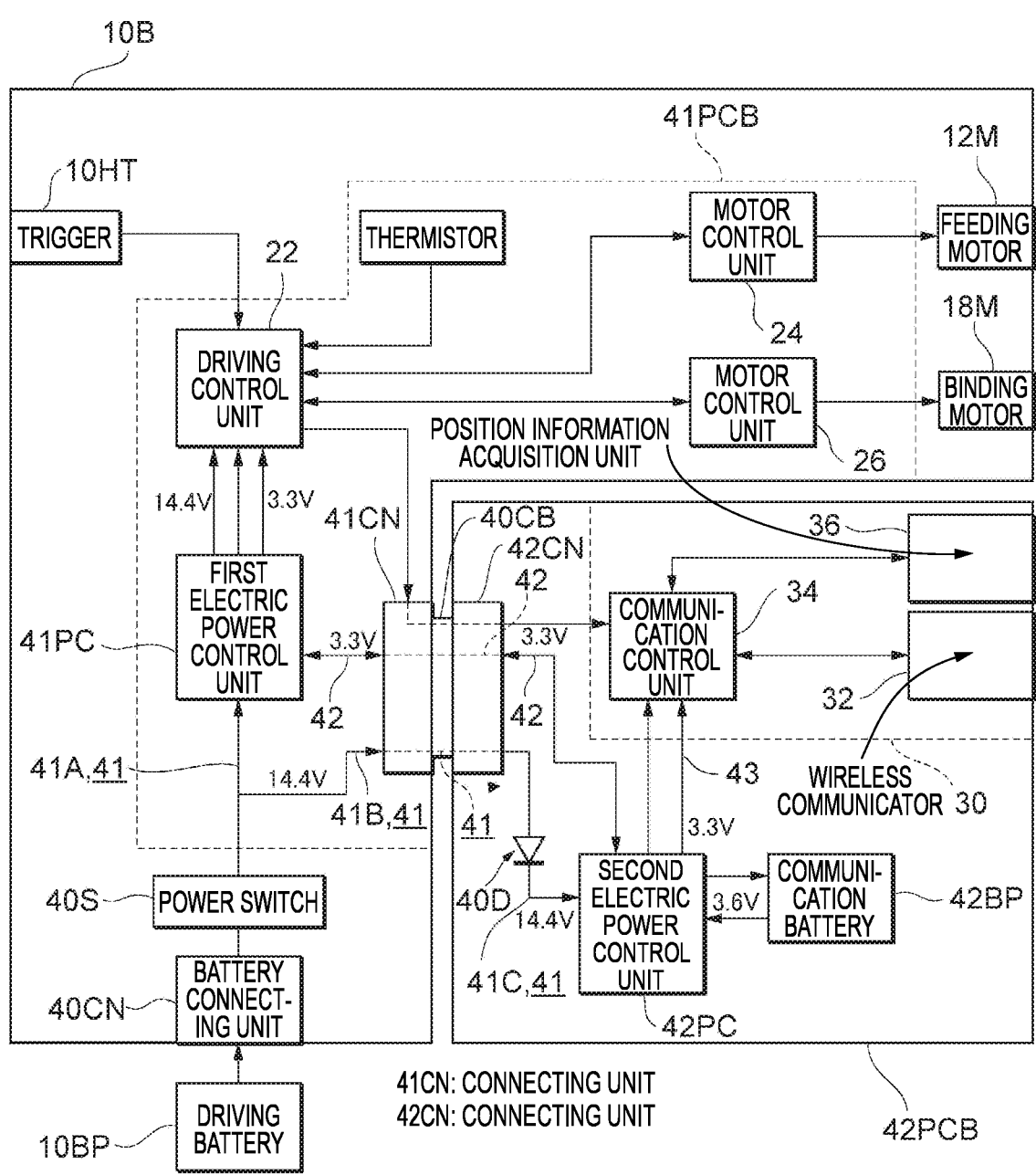
FIG. 4 is a block diagram illustrating an electric circuit configuration of the reinforcing bar binding machine 10 according to the present embodiment.

FIG. 4 is a block diagram illustrating an electric circuit configuration of the reinforcing bar binding machine 10 according to the present embodiment. In FIG. 4, as a configuration of the reinforcing bar binding machine 10, the main body portion 10B and a second circuit board 42PCB connected to the main body portion 10B are illustrated.

The main body portion 10B includes a battery connecting unit 40CN that is supplied with electric power (voltage) from the battery 10BP (which may be referred to as "driving battery"), a power switch 40S that turns on or off the supply of the electric power (voltage) supplied from the battery connecting unit 40CN, a first electric power control unit 41PC that is supplied with the electric power (voltage) from the battery 10BP via the power switch 40S and supplies a first operating voltage for operating the driving control unit 22 based on a first power supply voltage supplied from the battery 10BP, the driving control unit 22 that operates based on the first operating voltage and generates a control signal for controlling the feeding motor 12M, a motor control unit 24 that controls a current flows through the stator of the feeding motor 12M based on the control signal generated by the driving control unit 22, and a motor control unit 26 that controls a current flowing through the stator of the binding motor 18M based on the control signal generated by the driving control unit 22.

The battery 10BP is capable of supplying the electric power for operating at least the driving control unit 22, the motor control units 24 and 26, the feeding motor 12M and the binding motor 18M, the communication control unit 34, the wireless communicator 32, and a position information acquisition unit 36, the last three of which will be described later. The battery 10BP is, for example, a rechargeable lithium ion secondary battery, and has a predetermined rated capacity, a rated voltage, and a rated current. For example, the battery 10BP has a rated capacity of 5.0 Ah and is capable of supplying a rated DC voltage of 14.4 V. However, as will be described later, the DC voltage supplied from the battery 10BP gradually decreases as the electric power of the battery 10BP is consumed.

The battery connecting unit 40CN is supplied with the DC voltage from the battery 10BP and supplies the DC voltage to the first electric power control unit 41PC. The main body portion 10B includes a first voltage line 41 connecting the battery connecting unit 40CN and the first electric power control unit 41PC, and the first power supply voltage of the direct current supplied from the battery 10BP is applied to the first voltage line 41.

The power switch 40S turns on or off the supply of the electric power (voltage) supplied from the battery 10BP to the first electric power control unit 41PC via the battery connecting unit 40CN in accordance with an operation of a main power switch (not shown) of the reinforcing bar binding machine 10. Therefore, when the worker turns off the main power switch, the power switch 40S shuts off (turns off) the supply of the electric power (voltage) from the battery 10BP to the first electric power control unit 41PC, and when the worker turns on the main power switch, the power switch 40S permits (turns on) the supply of the electric power (voltage) from the battery 10BP to the first electric power control unit 41PC.

The first electric power control unit 41PC generates a voltage for operating circuit elements including the driving control unit 22 based on the first power supply voltage supplied from the battery 10BP, and supplies the generated voltage to each of the circuit elements and the like. For example, based on the first power supply voltage of 14.4 V supplied from the battery 10BP, a voltage of 3.3 V, which is an operating voltage of the driving control unit 22, is generated and supplied to the driving control unit 22, and the first power supply voltage (14.4 V) is directly supplied to the motor control units 24 and 26 and the stators of the motors. Here, supplying a voltage includes generating and supplying a voltage and passing through and supplying the voltage without generating the voltage. The first electric power control unit 41PC is configured to further generate an intermediate voltage higher than the first operating voltage and smaller than the first power supply voltage, and is configured to supply the intermediate voltage to different circuit elements. The first electric power control unit 41PC may include a booster circuit that is configured to generate a voltage higher than the first power supply voltage and configured to supply the generated voltage to different circuit elements.

The driving control unit 22 may include a single or a plurality of processors implemented by an integrated circuit (IC), and a memory (including a non-volatile semiconductor memory that stores information in a non-transitory storage medium) storing firmware that is executed by the processor and that includes a computer instruction for executing each process described in the present embodiment. The driving control unit 22 may be implemented by an IC such as an ASIC, an FPGA, a microcontroller, or the like. The driving control unit 22 also functions as a part of the tool control portion. The driving control unit 22 may operate based on a voltage of 3.3 V, for example.

The driving control unit 22 comprehensively controls various functional units and members of the reinforcing bar binding machine 10. The driving control unit 22 generates, for example, the control signal for controlling the feeding motor 12M, and supplies the control signal to the motor control unit 24. Further, the driving control unit 22 generates, for example, the control signal for controlling the binding motor 18M, and supplies the control signal to the motor control unit 26. A driving control unit that generates a control signal for controlling the binding motor 18M and supplies the control signal to the motor control unit 26 may be provided separately from the driving control unit 22 in the same semiconductor chip. The driving control unit 22 is capable of controlling other actuators and the like of the reinforcing bar binding machine 10. Further, the driving control unit 22 supplies the first power supply voltage, which is supplied from the first electric power control unit 41PC, to the motor control units 24 and 26 (for example, positive power lines thereof). The driving control unit 22 is further configured to receive a signal for detecting that the trigger 10HT is pressed, and is configured to start a control operation of the motor based on reception of the signal. In addition, the driving control unit 22 may be configured to receive a signal indicating a temperature of the electric power tool (reinforcing bar binding machine 10) from a thermistor and control the feeding motor 12M based on reception of the signal. For example, the driving control unit 22 may generate different control signals in a case in which the temperature of the electric power tool is relatively high and a case in which the temperature of the electric power tool is relatively low, and may supply the control signals to the motor control unit 24.

Further, when the reinforcing bar binding machine 10 is actuated, the driving control unit 22 generates actuation information indicating that the reinforcing bar binding machine 10 is actuated. Specifically, the actuation information may be information indicating that the reinforcing bar binding machine 10 has performed binding. The driving control unit 22 may add a time stamp indicating a time point at which actuation is performed and other meta information to the actuation information. Further, the driving control unit 22 may generate information managed by various DB in the management server 50 such as an operation time of the binding, a current value during the binding, and a motor rotation speed during the binding, and may add the information in the actuation information. These pieces of information may be generated by the driving control unit 22 based on a signal or the like detected by a sensor provided in the reinforcing bar binding machine 10. The driving control unit 22 is connected to the communication control unit 34 via a communication line passing through a cable 40CB to be described later, and is configured to supply the generated actuation information (including the added various pieces of information) to the communication control unit 34 via the communication line.

The motor control unit 24 controls the current flowing through the stator of the feeding motor 12M based on the control signal generated by the driving control unit 22. For example, the motor control unit 24 may include a plurality of (for example, six) semiconductor elements connected in a three-phase bridge configuration between a power line of a positive electrode and a power line of a ground (reference potential) serving as a negative electrode, and a driver circuit that generates and supplies a gate signal (or a base signal) to a gate (or a base) of each of the semiconductor elements. The motor control unit 26 may be configured in the same manner as the motor control unit 24.

The feeding motor 12M, which is the electric motor in the present embodiment, includes, for example, the stator including three-phase windings connected to three-phase outputs of the motor control unit 24, and the rotor rotatable in either the forward direction or the backward direction in accordance with a rotating magnetic field generated by a current flowing through the windings of the stator. The feeding motor 12M may further include, for example, a hall element that detects a position of the rotor, and the driving control unit 22 may be configured to receive a position signal from the hall element and generate the control signal based on the position signal. The binding motor 18M may be configured in the same manner as the feeding motor 12M.

The main body portion 10B further includes a first circuit board 41PCB on which at least the first electric power control unit 41PC, the driving control unit 22, and the motor control units 24 and 26 are mounted. The first circuit board 41PCB is provided with a first connecting unit 41CN to be connected to the second circuit board 42PCB, which will be described later, via the cable 40CB. As shown in FIG. 3, the first voltage line 41 includes a first wiring portion 41A connecting the battery connecting unit 40CN and the first electric power control unit 41PC, and a second wiring portion 41B branching from the first wiring portion 41A and connected to the first connecting unit 41CN. Furthermore, the main body portion 10B includes a second voltage line 42 to which the first operating voltage (3.3 V) generated by the first electric power control unit 41PC can be applied and that connects the first electric power control unit 41PC and the first connecting unit 41CN. Although the first circuit board 41PCB is conceptually shown in FIG. 3, the actual first circuit board 41PCB is formed in a rectangular shape having two parallel long sides and two parallel short sides connecting end portions of the long sides.

With the above configuration, it is possible to supply the electric power for implementing the function of the electric power tool. Next, a configuration related to the communication function of the electric power tool will be described.

Similarly, as shown in FIG. 4, the second circuit board 42PCB includes a second battery 42BP for communication (which also may be referred to as a "communication battery"), a second electric power control unit 42PC capable of supplying, based on the first power supply voltage supplied from the main battery 10BP, a second operating voltage for operating the communication control unit 34, and supplying, based on a second power supply voltage supplied from the second battery 42BP in cases such as one where the main battery 10BP is detached, the second operating voltage for operating the communication control unit 34, and the communication control unit 34 that controls the wireless communicator 32 (an example of the "communicator 32") and the position information acquisition unit 36 based on the second operating voltage supplied from the second electric power control unit 42PC.

Further, the communication portion 30 of the electric power tool includes the position information acquisition unit 36 that acquires position information of the electric power tool and supplies the position information to the communication control unit 34, and the wireless communicator 32 that wirelessly transmits and receives information to and from an external device.

The position information acquisition unit 36 includes, for example, an antenna capable of receiving a signal from a positioning satellite of GPS (or another GNSS such as GLONASS), and a reception circuit that acquires the position information of the electric power tool based on the signal received by the antenna. Further, the position information acquisition unit 36 may generate information indicating accuracy (data accuracy) of the position information based on, for example, intensity of the signal from the positioning satellite.

The wireless communicator 32 includes, for example, an antenna that is capable of transmitting and receiving information to and from a remote base station based on a predetermined standard using a frequency band of a licensed band or an unlicensed band based on a LPWA technology, an RFIC that demodulates an analog signal received by the antenna and supplies the demodulated analog signal to a baseband IC and modulates the signal supplied from the baseband IC into an analog signal and transmit the analog signal from the antenna, and the baseband IC that decodes and encodes the signal acquired from the RFIC according to a protocol defined in the standard and transmits and receives information. The communicator 32 may be compatible with a short-range wireless communication method such as Bluetooth (registered trademark) or wireless LAN.

With the above-described configuration, for example, the communication control unit 34 is capable of providing the position information acquired by the position information acquisition unit 36 and the information indicating the accuracy thereof to an outside by transmitting the position information and the accuracy information via the wireless communicator 32. The position information may be corrected based on data detected by an acceleration sensor or the like provided in the reinforcing bar binding machine 10. Further, the position information may include elevation information measured based on an elevation sensor provided in the reinforcing bar binding machine 10. Furthermore, for example, the communication control unit 34 is capable of providing the actuation information of the electric power tool to the outside by transmitting the actuation information acquired from the driving control unit 22 of the main body portion 10B via the wireless communicator 32. The communication control unit 34 may add, to the actuation information, the time stamp indicating the time point at which the actuation is performed.

The second circuit board 42PCB is provided with a second connecting unit 42CN that is connected to the first circuit board 41PCB via the cable 40CB. As shown in FIG. 4, with respect to the first voltage line 41, the first wiring portion 41A and the second wiring portion 41B are formed on the first circuit board 41PCB, and a third wiring portion 41C electrically connected to the first wiring portion 41A and the second wiring portion 41B via the connectors is formed on the second circuit board 42PCB. With respect to the second voltage line 42, a wiring portion connecting the first connecting unit 41CN and the first electric power control unit 41PC is formed on the first circuit board 41PCB, and a wiring portion electrically connected to the wiring portion via the connectors and connected to the second electric power control unit 42PC is formed on the second circuit board 42PCB.

The second battery 42BP supplies electric power for operating at least the communication control unit 34, the wireless communicator 32, and the position information acquisition unit 36. The second battery 42BP is, for example, a rechargeable lithium ion secondary battery, and has a predetermined rated capacity, a rated voltage, and a rated current. For example, the second battery 42BP has a rated capacity smaller than that of the main battery 10BP, and is capable of supplying a rated DC voltage of 3.6 V. In addition, since the second battery 42BP is housed in a housing constituting the main body portion 10B of the electric power tool, unlike the main battery 10BP, the second battery 42BP is not provided in a manner of being easily attachable to and detachable from the second circuit board 42PCB, but is integrally fixed to the second circuit board 42PCB. The second battery 42BP may not be integrally fixed to the second circuit board 42PCB, and may be provided in a manner of being attachable to and detachable from the second circuit board 42PCB.

The second electric power control unit 42PC is capable of generating, based on the power supply voltage supplied from the battery 10BP, the voltage for operating each of the circuit elements including the communication control unit 34 and the driving control unit 22, and supplying the generated voltage to each of the circuit elements and the like. For example, the second electric power control unit 42PC generates a voltage of 3.3 V, which is a voltage for operating the communication control unit 34, based on the power supply voltage of 14.4 V supplied from the battery 10BP, and supplies the generated voltage to the communication control unit 34 via a third voltage line 43 connecting the second electric power control unit 42PC and the communication control unit 34, and, similarly, generates a predetermined operating voltage and supplies the predetermined operating voltage to the position information acquisition unit 36 and the wireless communicator 32.

The second electric power control unit 42PC is capable of generating the operating voltage for operating each of the circuit elements and the like based on the DC voltage of 3.6 V corresponding to the second power supply voltage supplied from the second battery 42BP, and supplying the operating voltage to each of the circuit elements including the communication control unit 34 and the driving control unit 22. Here, the second electric power control unit 42PC includes a booster circuit capable of generating a voltage higher than the second power supply voltage in order to operate the antenna.

With the above configuration, when the main battery 10BP is detached, the second electric power control unit 42PC is configured to wirelessly transmit and receive information to and from the external device by operating the driving control unit 22, the communication control unit 34, the position information acquisition unit 36, and the wireless communicator 32 based on the second power supply voltage supplied from the second battery 42BP. Accordingly, even when the main battery 10BP is detached, the communication control unit 34 is configured to provide the position information and/or the work information of the electric power tool to the outside by transmitting, via the wireless communicator 32, the position information acquired by the position information acquisition unit 36 and/or the work information supplied from the driving control unit 22, and is configured to store update data for updating the firmware of the driving control unit 22 received via the wireless communicator 32 in, for example, a non-volatile semiconductor memory that constitutes the driving control unit 22.

Further, the second electric power control unit 42PC is configured to generate, based on the power supply voltage supplied from the main battery 10BP, a charging voltage for charging the second battery 42BP, and is configured to charge the second battery 42BP. Therefore, when the battery 10BP is attached, the reinforcing bar binding machine 10 according to the present embodiment is configured to operate the driving control unit 22, the motor control units 24 and 26, the motors (feeding motor 12M and binding motor 18M), the communication control unit 34, the position information acquisition unit 36, and the wireless communicator 32 based on the electric power supplied from the battery 10BP, and is configured to charge the second battery 42BP. When the main battery 10BP is detached, the reinforcing bar binding machine 10 according to the present embodiment is configured to operate the driving control unit 22, the communication control unit 34, the position information acquisition unit 36, and the wireless communicator 32 based on the electric power supplied from the second battery 42BP. As described above, since supplying a voltage includes passing through and supplying a voltage without generating the voltage, a voltage serving as a power supply may be supplied to the communication control unit 34 and the like by directly connecting a wiring, to which an output voltage from the second battery 42BP is applied, to a power supply terminal of the communication control unit 34 and the like, or the voltage serving as a power supply may be supplied to the driving control unit 22 and the like by directly connecting a wiring, to which an output voltage from the second electric power control unit 42PC is applied, to a power supply terminal of the driving control unit 22 and the like.

For example, the reinforcing bar binding machine 10 may determine whether the reinforcing bar binding machine 10 is located in a specific region (which may be registered in tool information DB 512 or the like) designated in advance by a user or the like, and may output a determination result. In this determination, for example, when it is determined that the reinforcing bar binding machine is outside the region for a predetermined number of times or more, it may be output as a final determination result that the reinforcing bar binding machine is outside the region. For example, the reinforcing bar binding machine 10 may store information on the region in any storage unit (memory or storage) in advance. Further, the reinforcing bar binding machine 10 may include a determination unit that determines whether the position information acquired by the position information acquisition unit 36 is included in the region stored in the storage unit described above. For example, the determination unit may be provided on the first circuit board 41PCB or the second circuit board 42PCB, or the driving control unit 22 and the communication control unit 34 may include the determination unit. A mode of an output of the determination result is not particularly limited, and may include displaying on a predetermined display device, causing a predetermined light source to emit light, or causing a predetermined speaker to output a sound such as a warning sound.

The reinforcing bar binding machine 10 may be connectable to a terminal (may include any information processing apparatus, or may be the user terminal 60) such as a smartphone in which an application for managing the reinforcing bar binding machine 10 is installed, by wireless communication or the like. The terminal may receive predetermined information from the management server 50 or the reinforcing bar binding machine 10 and display the information. The information may include, for example, a status of the reinforcing bar binding machine 10 (during repair, transportation, work, returning preparation, or the like).

(3) Management Server 50 and User Terminal 60

(3-1) Hardware Configuration

Figure 5:
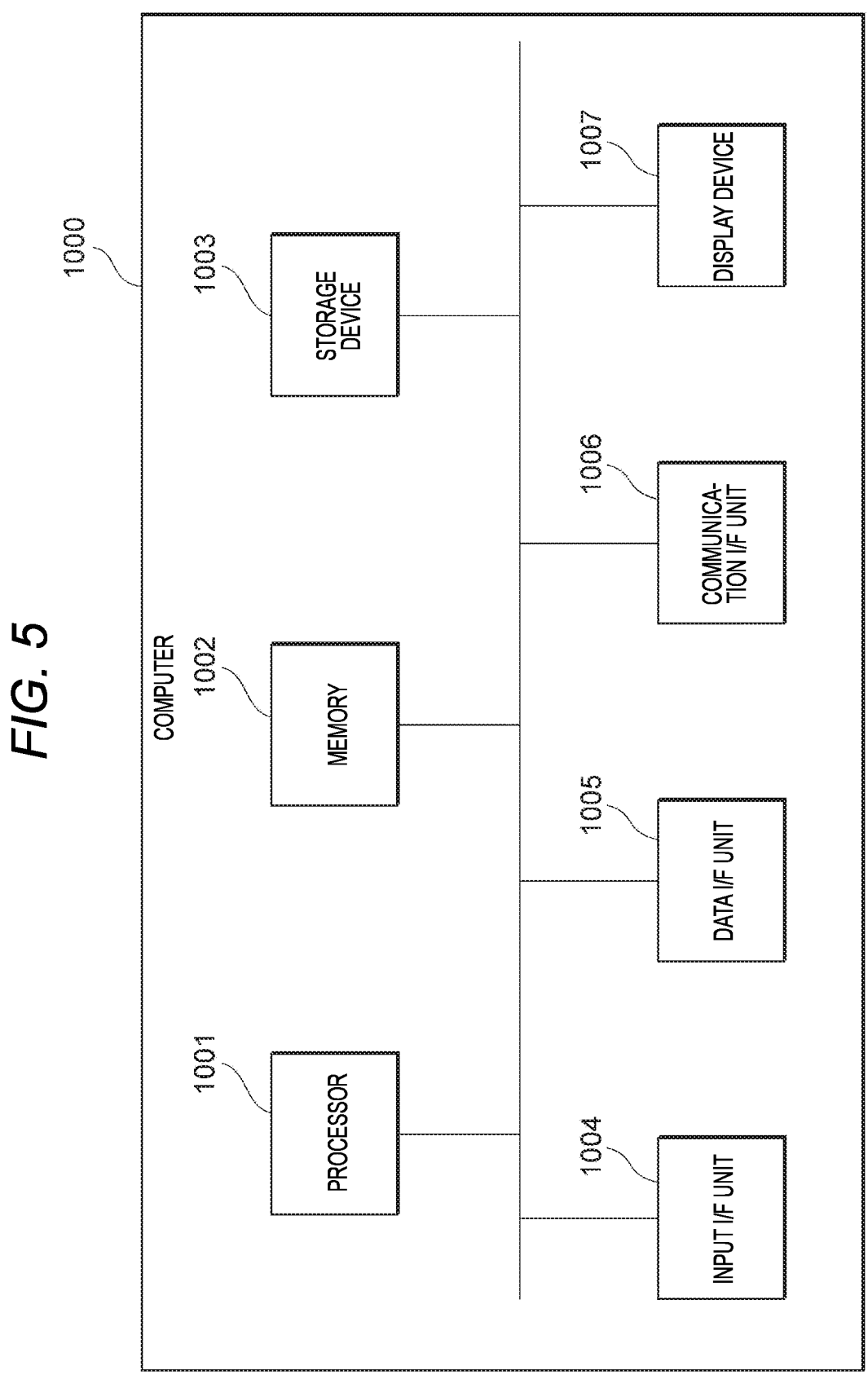
FIG. 5 is a schematic diagram illustrating an example of a hardware configuration of a computer 1000.

A hardware configuration of each of the management server 50 and the user terminal 60 provided in the machine management system 1 will be described with reference to FIG. 5. Each of these apparatuses can include one or a plurality of computers 1000 as the information processing apparatus. FIG. 5 is a schematic diagram showing an example of a hardware configuration of the computer 1000. Each of the management server 50 and the user terminal 60 may not have a part of the configuration shown in FIG. 5, or may have a configuration not shown in FIG. 5.

As shown in FIG. 5, the computer 1000 includes a processor 1001, a memory 1002, a storage device 1003, an input I/F unit 1004, a data I/F unit 1005, a communication I/F unit 1006, and a display device 1007.

The processor 1001 controls various processes in the computer 1000 by executing a program stored in the memory 1002. For example, various functional units of a control unit 52 of the management server 50 and various functional units of a control unit 62 of the user terminal 60 can be implemented as a program that is temporarily stored in the memory 1002 and mainly operates on the processor 1001.

The memory 1002 is, for example, a storage medium such as a random access memory (RAM). The memory 1002 temporarily stores a program code of the program executed by the processor 1001 and data necessary for executing the program.

The storage device 1003 is, for example, a non-volatile storage medium such as a hard disk drive (HDD) or a flash memory. The storage device 1003 stores an operating system and various programs for implementing the above configurations. In addition, the storage device 1003 can store various databases (DB) and the like. Such a program or database is loaded into the memory 1002 as necessary, and is referenced from the processor 1001.

The input I/F unit 1004 is a device that receives an operation input by an operator. A specific example of the input I/F unit 1004 includes a keyboard, a mouse, a touch panel, various sensors, wearable devices, or the like. The input I/F unit 1004 may be connected to the computer 1000 via an interface such as a universal serial bus (USB).

The data I/F unit 1005 is a device that inputs data from an outside of the computer 1000. A specific example of the data I/F unit 1005 includes a drive device or the like that reads data stored in various storage media. The data I/F unit 1005 may be provided outside the computer 1000. In this case, the data I/F unit 1005 is connected to the computer 1000 via, for example, an interface such as a USB.

The communication I/F unit 1006 is a device that performs data communication with an external device of the computer 1000 via a communication network N such as the Internet, by wire or wireless. The communication I/F unit 1006 may be provided outside the computer 1000. In this case, the communication I/F unit 1006 is connected to the computer 1000 via, for example, an interface such as a USB.

The display device 1007 is a device that displays various kinds of information. A specific example of the display device 1007 include a liquid crystal display, an organic electro-luminescence (EL) display, and a display of a wearable device. The display device 1007 may be provided outside the computer 1000. In this case, the display device 1007 is connected to the computer 1000 via, for example, a display cable or the like.

(3-2) Functional Configuration of Management Server 50

Figure 6:
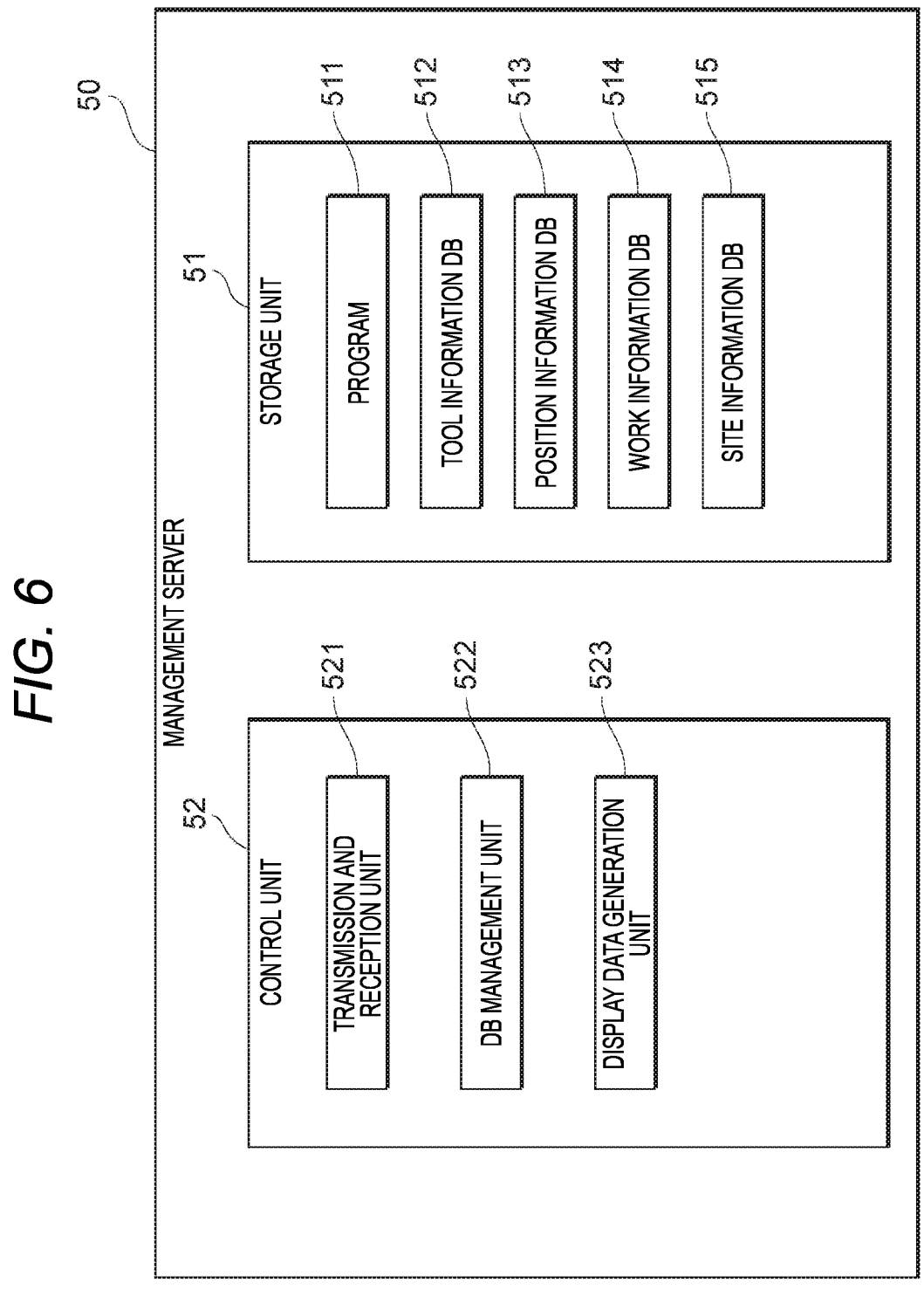
FIG. 6 is a diagram illustrating an example of a functional configuration of a management server 50 according to the present embodiment.

FIG. 6 is a diagram illustrating an example of a functional configuration of the management server 50 according to the present embodiment. As shown in FIG. 6, the management server 50 includes, for example, a storage unit 51 and the control unit 52. The control unit 52 includes, as functional units, a transmission and reception unit 521, a DB management unit 522, and a display data generation unit 523. These are implemented by cooperation of the processor 1001, the memory 1002, the storage device 1003, the input I/F unit 1004, the data I/F unit 1005, the communication I/F unit 1006, and the display device 1007 provided in the computer 1000.

The storage unit 51 stores, for example, a program 511, the tool information DB 512, position information DB 513, work information DB 514, and site information DB 515.

When the program 511 is executed by the processor 1001, the various functional units (transmission and reception unit 521, DB management unit 522, display data generation unit 523, and the like) of the control unit 52 are implemented. The program 511 can be stored in a storage medium. The storage medium storing the program 511 may be a non-transitory computer readable storage medium. The non-transitory storage medium is not particularly limited, and may be, for example, a storage medium such as a USB memory or a CD-ROM.

The tool information DB 512 is a database that manages tool information (information related to specifications and the like) of the reinforcing bar binding machine 10. In the tool information DB 512, the information related to the specifications of the tool or the like is registered in association with the reinforcing bar binding machine 10. For example, information input by the user via the user terminal 60 may be registered in the tool information DB 512, or information acquired by the management server 50 from the reinforcing bar binding machine 10 may be registered in the tool information DB 512. An example of the information registered in the tool information DB 512 is shown in the following Table 1.

TABLE 1

| No. | Item |
| --- | --- |
| 1 | Main body serial number |
| 2 | Battery voltage (V) |
| 3 | Battery identification information |
| 4 | Board temperature (° C.) |
| 5 | Software version information |
| 6 | Firmware version information |
| 7 | Error information |
| 8 | Communication information |
| 9 | User information |
| 10 | Deterioration information |

A "main body serial number" is a serial number allocated to the reinforcing bar binding machine 10. A "battery voltage (V)" is information indicating a voltage of a battery (driving battery 10BP and/or communication battery 42BP, and the like) provided in the reinforcing bar binding machine 10. The "battery identification information" is identification information (ID) for identifying the battery provided in the reinforcing bar binding machine 10. A "board temperature (° C.)" is information on a temperature of a board (first circuit board 41PCB and/or second circuit board 42PCB, and the like) provided in the reinforcing bar binding machine 10 (may be a temperature of a board detected by a predetermined sensor, a temperature indicating heat resistance specific to the board, or the like). "Software version information" is information indicating a version of software installed in the reinforcing bar binding machine 10. "Firmware version information" is information indicating a version of firmware installed in the reinforcing bar binding machine 10. "Error information" is error information related to the reinforcing bar binding machine 10, and may include, for example, error information in the position information DB 513 to be described later and error information in the work information DB 514. "Communication information" is information indicating a history of communication when the position information and the work information are transmitted from the reinforcing bar binding machine 10 to the management server 50. "User information" is information indicating the user of the reinforcing bar binding machine 10 (attribute information such as a name, identification information allocated to the user, or the like). "Deterioration information" is information indicating a deterioration state of the reinforcing bar binding machine 10. Further, the tool information DB 512 may include the name of the reinforcing bar binding machine 10 freely set by the user or the like.

The position information DB 513 is a database that manages the position information and the like of the reinforcing bar binding machine 10. In the position information DB 513, the position information and other related information are registered in association with the reinforcing bar binding machine 10. For example, the information input by the user via the user terminal 60 may be registered in the position information DB 513, or the information acquired by the management server 50 from the reinforcing bar binding machine 10 may be registered in the position information DB 513. An example of the information registered in the position information DB 513 is shown in the following Table 2.

TABLE 2

| No. | Item |
| --- | --- |
| 1 | Time point information |
| 2 | Position information |
| 3 | Data accuracy |
| 4 | Movement information |
| 5 | Error information |

"Time point information" may be information related to a time point associated with the position information, and may be, for example, information such as a time stamp when the reinforcing bar binding machine 10 acquires the position information, or information such as a time stamp when the management server 50 acquires the position information from the reinforcing bar binding machine 10. "Position information" is information indicating a position of the reinforcing bar binding machine 10, and may be, for example, the position information acquired by the position information acquisition unit 36 of the reinforcing bar binding machine 10. The position information may be represented as, for example, latitude and longitude. When the elevation information indicates an abnormal value such as a predetermined threshold value or more, the elevation information may be removed by, for example, the DB management unit 522. "Data accuracy" is information indicating the accuracy of the position information, and may be, for example, information acquired by the position information acquisition unit 36 of the reinforcing bar binding machine 10. "Movement information" is information indicating movement of the reinforcing bar binding machine 10, that is, information indicating a temporal change in position information. The "movement information" may include information indicating a moving speed, a mechanical angle, acceleration, and the like. "Error information" is information indicating an error related to the position information, and may include, for example, information indicating a history of an error occurring when the position information is transmitted from the reinforcing bar binding machine 10 to the management server 50.

The work information DB 514 is a database that manages the work information and the like of the reinforcing bar binding machine 10. In the work information DB 514, the work information and other related information are registered in association with the reinforcing bar binding machine 10. As will be described later, the work information may be generated by the DB management unit 522 or the like, for example, based on the actuation information acquired by the management server 50 from the reinforcing bar binding machine 10. For example, the information input by the user via the user terminal 60 may be registered in the work information DB 514, or the information acquired by the management server 50 from the reinforcing bar binding machine 10 may be registered in the work information DB 514. An example of the information registered in the work information DB 514 is shown in Table 3 below.

TABLE 3

| No. | Item |
| --- | --- |
| 1 | Actuation information |
| 2 | The number of times of binding |
| 3 | Consumable item information |
| 4 | Automatic power-off occurrence information |
| 5 | Binding operation interval |
| 6 | Operation time |
| 7 | Current value |
| 8 | Motor rotation speed |
| 9 | Error information |

"Actuation information" is, for example, information indicating that the reinforcing bar binding machine 10 is actuated (binding is executed). The "actuation information" may include the position information of the reinforcing bar binding machine 10 and a predetermined time point information. The time point information may be, for example, a time point (actuation time point) at which the reinforcing bar binding machine 10 is actuated (the binding is executed), a time point (transmission time point) at which the reinforcing bar binding machine 10 transmits the information indicating that the reinforcing bar binding machine 10 is actuated (the binding is executed) to the management server 50, and a time point (reception time point) at which the management server 50 receives the information indicating that the reinforcing bar binding machine 10 is actuated (the binding is executed) from the reinforcing bar binding machine 10. By comparing the actuation time point with the operation time, a time lag between the reception time point and the time of actuating (the time of binding) is grasped, whereby a communication environment of the reinforcing bar binding machine 10 can be grasped. Further, it is possible to grasp the communication environment for each position based on the position information in the actuation information. Accordingly, for example, the display data generation unit 523 of the management server 50 can change a content of display data according to the communication environment. "The number of times of binding" is, for example, the number of times of binding performed by the reinforcing bar binding machine 10 in a predetermined period. For example, "the number of times of binding" may be generated by the DB management unit 522 aggregating the actuation information acquired from the reinforcing bar binding machine 10, and may be registered in the work information DB 514. Specifically, "the number of times of binding" may be information generated by summing up the number of binding included in the actuation information in the predetermined period. The predetermined period may be set freely, or may be a period calculated after a predetermined reset operation is performed. Further, "the number of times of binding" may be a total number of times of binding performed by the reinforcing bar binding machine 10 in the past. "Consumable item information" is information related to the wire W as a consumable item, and more specifically, may be, for example, information indicating a type of the wire W such as a shape, information indicating a remaining amount of the wire W, or the like. "Automatic power-off occurrence information" is history information when the power of the reinforcing bar binding machine 10 is automatically turned off, for example, when the operation is not performed for a predetermined time. A "binding operation interval" is an interval at which the binding is performed (time interval from when the binding is performed until when the next binding is performed). An "operation time" is an operation time required for the binding, and may be, for example, a value set as an operation time required for the binding, or may be an individual operation time actually required for individual binding or an integrated value thereof. A "current value" is a current value generated in the reinforcing bar binding machine 10 at the time of binding, and may be, for example, a value set as a current value, or may be an individual current value actually required for individual binding. A "motor rotation speed" is a motor rotation speed generated in the reinforcing bar binding machine 10 at the time of binding, and may be, for example, a value set as the motor rotation speed, or may be an individual motor rotation speed actually required for individual binding. "Error information" is information indicating an error related to the work information of the reinforcing bar binding machine 10, and may include, for example, information indicating a failure of the binding operation of the reinforcing bar binding machine 10, or information indicating a history of the error occurring when the work information is transmitted from the reinforcing bar binding machine 10 to the management server 50. In addition, the work information DB 514 may include various setting values related to the binding of the reinforcing bar binding machine 10 (tightening force, rotational force at the time of actuating, information of a machine connected to the reinforcing bar binding machine 10, movable unit information, and the like), a flag indicating that a specific operation has occurred, and the like.

The site information DB 515 is a database that manages site information and the like. In the site information DB 515, the work information and other related information are registered in association with the reinforcing bar binding machine 10. For example, the information input by the user via the user terminal 60 may be registered in the site information DB 515, or the information acquired by the management server 50 from the reinforcing bar binding machine 10 may be registered in the site information DB 515. An example of information registered in the site information DB 515 is shown in Table 4 below.

TABLE 4

| No. | Item |
| --- | --- |
| 1 | Site name |
| 2 | Site location |
| 3 | Site range |
| 4 | Image |
| 5 | Owner |
| 6 | Construction period |
| 7 | Contractee |
| 8 | Contractor |
| 9 | Worker |

A "site name" is information indicating a name, an abbreviation, and the like of a site. A "site location" is, for example, information indicating a location of the site, and may be, for example, an address, or may be information represented as a region such as longitude and latitude. The site location may include information indicating an elevation of the site. A "site range" is information indicating a region of the site. An "image" is information indicating an image obtained by imaging the site. An "owner" is information indicating an owner related to construction performed at the site. A "construction period" is a period of the construction performed at the site, and may include, for example, a construction start date and an end date. A "contractee" is information indicating a contractee related to the construction performed at the site. A "contractor" is information indicating a contractor related to the construction performed at the site. A "worker" is information related to a worker allocated to the site, and may include, for example, a total number of workers and attribute information (name, affiliation, department, or the like) related to each worker. In addition, an attachment reinforcing bar tonnage (which may be used for calculating the predicted number of binding and predicting the construction period), a combination diameter of the reinforcing bars, setting of a geofence, a last confirmation date and time of the position information, a total floor area, a structure of a construct to be constructed, and the like may be included.

The control unit 52 includes, for example, the transmission and reception unit 521, the DB management unit 522, and the display data generation unit 523.

The transmission and reception unit 521 has a function as a transmission unit and a reception unit, and transmits and receives various types of data to and from another information processing apparatus. For example, the transmission and reception unit 521 receives operation information corresponding to a user operation from the user terminal 60. The operation indicated by the operation information may include, for example, designation of a region on a map and the like in addition to designation of transition of various screens, selection of various selection units, and input of any information. For example, the transmission and reception unit 521 transmits the display data generated by the display data generation unit 523 to the user terminal 60. The display data may include display data of various screens, various types of information (tool information, work information, and the like) related to the reinforcing bar binding machine 10, various types of information (site information) related to the site, and the like.

The DB management unit 522 manages various DB (tool information DB 512, position information DB 513, work information DB 514, and site information DB 515) in the management server 50. For example, the DB management unit 522 may register information input by any user in the tool information DB 512, the position information DB 513, the work information DB 514, the site information DB 515, and the like. For example, when the management server 50 receives binding information transmitted in a case in which the reinforcing bar binding machine 10 performs binding or the like, the DB management unit 522 may register the binding information in the work information DB 514 or the like. Further, the DB management unit 522 may generate the work information based on the actuation information at any timing, and register the work information in the work information DB 514 or the like.

The display data generation unit 523 generates various display data to be displayed on any display device. In the generation of the display data, for example, the display data generation unit 523 may extract necessary information from various DB (tool information DB 512, position information DB 513, work information DB 514, site information DB 515, and the like) in the management server 50. The display data generation unit 523 may generate display data for displaying various screens (position information screen, work information screen, machine management screen, site management screen, and the like to be described later) to be displayed on a display device of the user terminal 60, for example. In particular, the display data generation unit 523 may generate display data related to the work information of the specific reinforcing bar binding machine 10. Here, the specific reinforcing bar binding machine 10 may be, for example, the reinforcing bar binding machine 10 of which the position information is included in a designation region (which may include an elevation) designated by the user in the user terminal 60 as will be described later. For example, when information of the designation region is included in a request of the display data acquired from the user terminal 60, the display data generation unit 523 first refers to the tool information DB 512 or the like to extract the reinforcing bar binding machine 10 of which the position information is included in the designation region. Further, the work information for a desired period corresponding to the extracted reinforcing bar binding machine 10 is extracted from the work information DB 514, and the extracted work information is totaled and included in the display data.

For example, the display data generation unit 523 may calculate predetermined efficiency related to the reinforcing bar binding machine 10 based on the work information and generate display data of the efficiency. The efficiency is not particularly limited as long as it is based on the work information, and may include, for example, (a) efficiency related to the working of the reinforcing bar binding machine 10, (b) efficiency related to allocation of the reinforcing bar binding machine 10 to the worker, and (c) efficiency related to progress of a process using the reinforcing bar binding machine 10.

(a) The efficiency related to the working of the reinforcing bar binding machine 10 may be specifically defined as a ratio of the number of the reinforcing bar binding machines which are currently working to a total number of the plurality of reinforcing bar binding machines 10 (a total number held by the user or a total number of the reinforcing bar binding machines 10 allocated to a predetermined site). Accordingly, it is possible to easily grasp a surplus state of the reinforcing bar binding machines 10 that do not work.

(b) The efficiency related to the allocation of the reinforcing bar binding machine to the worker may be defined as, for example, a ratio of the number of workers to which the reinforcing bar binding machines 10 are allocated to a total number of workers (may be a total number of workers allocated to the predetermined site, or may be any number of workers). Accordingly, it is possible to easily grasp the surplus state of the workers to which the reinforcing bar binding machines 10 are not allocated.

(c) The efficiency related to the progress of the process using the reinforcing bar binding machine 10 may be defined as, for example, a ratio of a total number of binding at the present time to the number of binding set in construction using the reinforcing bar binding machine 10. Accordingly, it is possible to easily grasp the progress status of the construction using the reinforcing bar binding machine 10.

Further, the display data generation unit 523 may generate display data of various proposals related to the reinforcing bar binding machine 10 based on the various efficiency described above. The proposal is not particularly limited as long as it relates to the reinforcing bar binding machine 10, and may be a proposal for improving the various efficiency described above, and may include, for example, (a') a proposal related to the working of the reinforcing bar binding machine 10, (b') a proposal related to the allocation of the reinforcing bar binding machine 10 to the worker, and (c') a proposal related to the progress of the process using the reinforcing bar binding machine 10. Further, the proposal may include, for example, a proposal of rearrangement of the reinforcing bar binding machine 10 to the site, and a proposal of maintenance of the reinforcing bar binding machine 10.

The management server 50 may calculate a cost (construction cost and the like) required for the binding performed by the reinforcing bar binding machine 10 based on the number of times of binding and the like, and may output the cost (for example, transmit to the user terminal 60). The cost can be calculated, for example, by multiplying the number of times of binding by a unit price of the consumable item used for binding the wire W or the like.

(3-3) Functional Configuration of User Terminal 60

Figure 7:
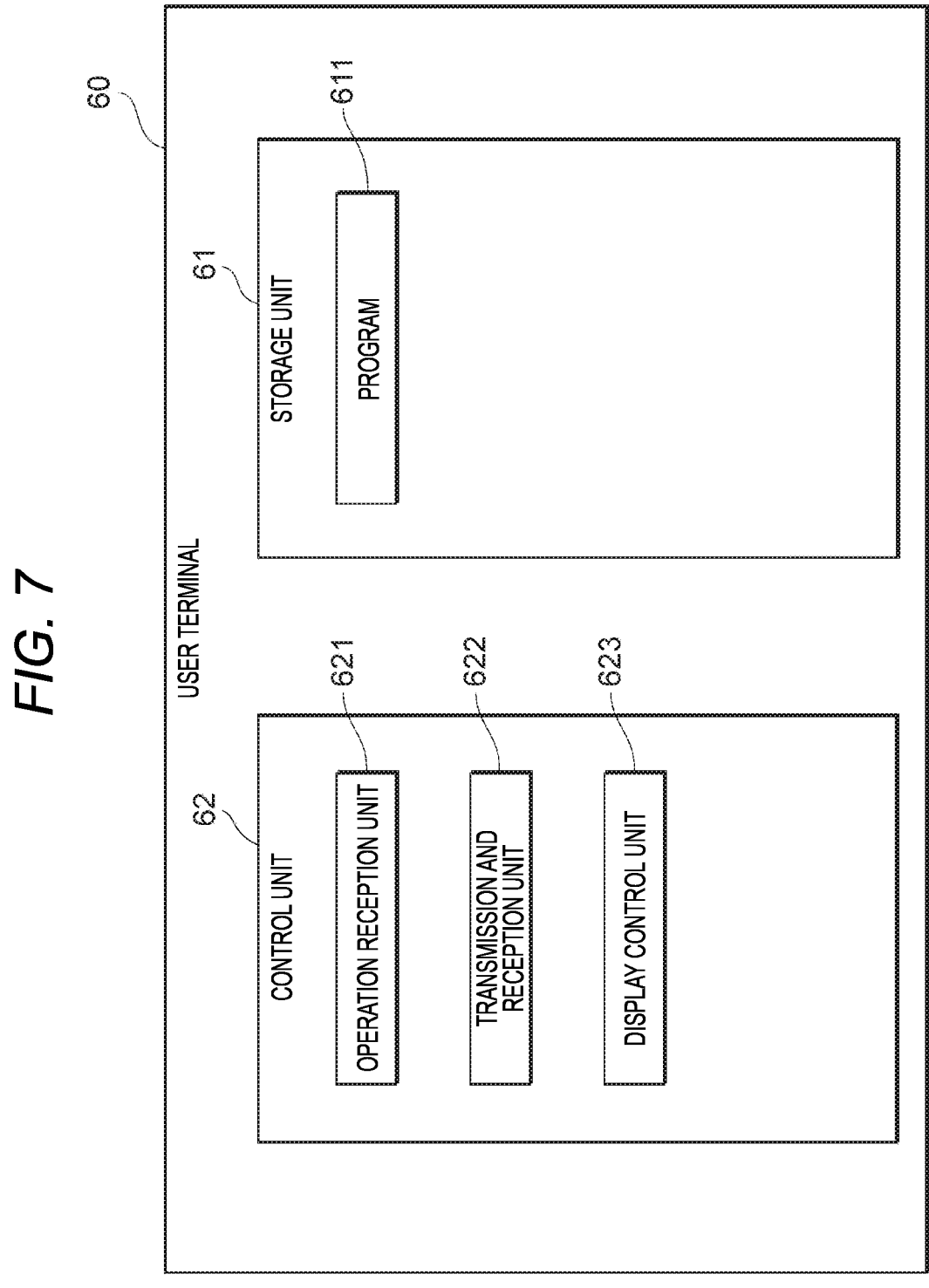
FIG. 7 is a diagram illustrating an example of a functional configuration of a user terminal 60 according to the present embodiment.

FIG. 7 is a diagram illustrating an example of a functional configuration of the user terminal 60 according to the present embodiment. As shown in FIG. 7, the user terminal 60 includes, for example, a storage unit 61 and the control unit 62. The control unit 62 includes, as functional units, an operation reception unit 621, a transmission and reception unit 622, and a display control unit 623. These are implemented by cooperation of the processor 1001, the memory 1002, the storage device 1003, the input I/F unit 1004, the data I/F unit 1005, the communication I/F unit 1006, and the display device 1007 provided in the computer 1000.

The storage unit 61 stores, for example, a program 611. The program 611 is executed by the processor 1001 provided in the user terminal 60, whereby various functional units (operation reception unit 621, transmission and reception unit 622, display control unit 623, and the like) of the control unit 62 are implemented. The program 611 can be stored in a storage medium. The storage medium storing the program 611 may be a non-transitory computer readable storage medium. The non-transitory storage medium is not particularly limited, and may be, for example, a storage medium such as a USB memory or a CD-ROM.

The control unit 62 includes, for example, the operation reception unit 621, the transmission and reception unit 622, and the display control unit 623.

The operation reception unit 621 receives various operations performed by the operator and generates operation information indicating the operation. The operation reception unit 621 receives various operations on various screens (position information screen, work information screen, machine management screen, site management screen, and the like) for confirming the work information and the like of the reinforcing bar binding machine 10, for example. The operation may include, for example, designation of a region (may include elevation) on a map and the like in addition to designation of transition of various screens, selection of various selection units, and input of any information. The operation of designating the region may be, for example, an operation of designating a shape (circle, quadrangle, polygon, or the like) defining the region.

The transmission and reception unit 622 has a function as a transmission unit and a reception unit, and transmits and receives various types of data to and from another information processing apparatus. For example, the transmission and reception unit 622 receives predetermined display data from the management server 50. The display data may include display data of various screens, various types of information (tool information, work information, and the like) related to the reinforcing bar binding machine 10, various types of information (site information) related to the site, and the like. For example, the transmission and reception unit 622 transmits the operation information generated by the operation reception unit 621 to the management server 50. The operation indicated by the operation information may include, for example, designation of a region on a map and the like in addition to designation of transition of various screens, selection of various selection units, and input of any information.

A display control unit 123 has a function of displaying various screens on an output device of the user terminal 60. For example, the display control unit 123 causes the output device to display the various screens (position information screen, work information screen, machine management screen, and site management screen, and the like) based on the display data received from the management server 50.

(4) Operation Sequence

Figure 8:
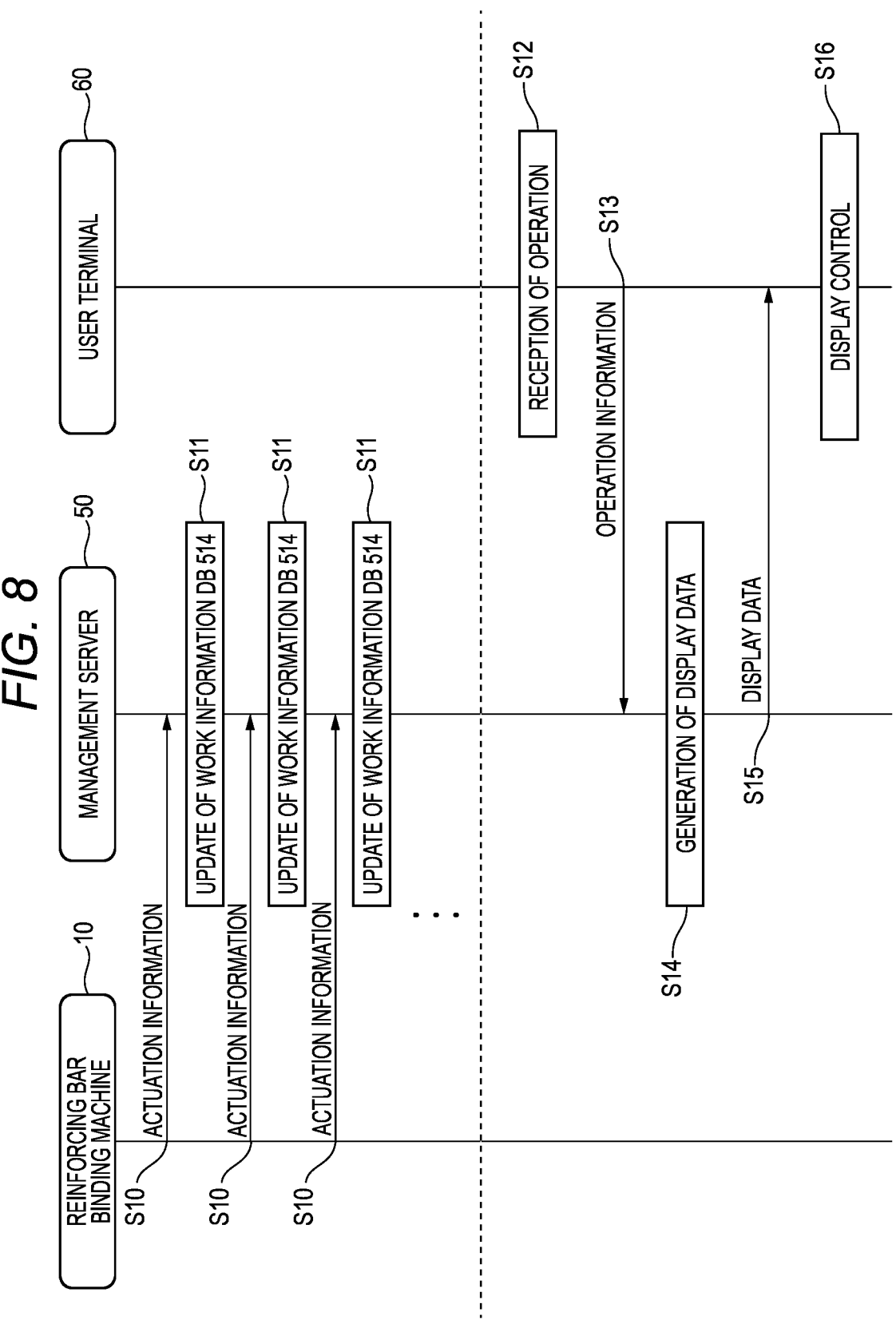
FIG. 8 is an operation sequence illustrating an example of an operation process executed by the machine management system 1 according to the present embodiment.

FIG. 8 is an operation sequence illustrating an example of an operation process executed by the machine management system 1 according to the present embodiment.

(S10) Transmission of Actuation Information

First, the reinforcing bar binding machine 10 transmits, to the management server 50, the actuation information (including the added information) indicating that the reinforcing bar binding machine 10 has performed the binding at a predetermined timing. For example, each time the binding is performed in accordance with the operation of the operator, the reinforcing bar binding machine 10 may transmit the actuation information indicating that the binding has been performed to the management server 50. For example, in a case in which the communication environment is poor or the like, when the actuation information cannot be transmitted every time the binding is performed, the reinforcing bar binding machine 10 may buffer the actuation information and transmit the buffered actuation information to the management server 50 when the communication environment is improved.

(S11) Update of Work Information DB 514

When the DB management unit 522 of the management server 50 receives the actuation information of step S10 from the reinforcing bar binding machine 10, the DB management unit 522 updates the work information DB 514 based on the actuation information. For example, the DB management unit 522 updates "the number of times of binding" of the work information DB 514 based on the actuation information. The DB management unit 522 may update the work information DB 514 based on the information added to the actuation information. For example, the DB management unit 522 may update the "consumable item information", the "automatic power-off occurrence information", the "binding operation interval", the "operation time", the "current value", the "motor rotation speed", the "error information", and the like of the work information DB 514 based on the information added to the actuation information.

(S12) Reception of Operation

The operation reception unit 621 of the user terminal 60 receives various operations performed by the user. The operation reception unit 621 receives, for example, designation of a region (may include elevation) on a map and the like in addition to designation of transition of various screens, selection of various selection units, and input of any information. In the case of the operation of designating the region, the operation reception unit 621 receives, for example, an operation of designating a shape (circle, quadrangle, polygon, or the like) that defines the region on the map.

(S13) Transmission of Operation Information

The transmission and reception unit 622 of the user terminal 60 transmits, to the management server 50, information (operation information) corresponding to the operation received by the operation reception unit 621 in step S12. The transmission and reception unit 521 of the management server 50 receives the operation information from the user terminal 60. The operation indicated by the operation information may include, for example, designation of a region (may include elevation) on a map and the like in addition to designation of transition of various screens, selection of various selection units, and input of any information.

(S14) Generation of Display Data

The display data generation unit 523 of the management server 50 generates predetermined display data corresponding to the operation information received in step S13. The display data may be, for example, display data for displaying various screens, or display data for displaying predetermined items in the various screens. The display data generation unit 523 may generate the display data based on the data (tool information, position information, work information, site information, and the like) in the various DB (tool information DB 512, position information DB 513, work information DB 514, and site information DB 515). The display data generation unit 523 may generate display data related to the work information of the specific reinforcing bar binding machine 10. Here, the specific reinforcing bar binding machine 10 may be, for example, the reinforcing bar binding machine in which the position information (which may include the elevation information) is included in the designation region designated by the user in the user terminal 60, as will be described later. For example, the display data generation unit 523 may calculate predetermined efficiency related to the reinforcing bar binding machine 10 based on the work information and generate display data of the efficiency. Further, the display data generation unit 523 may generate display data of various proposals related to the reinforcing bar binding machine 10 based on the various efficiency described above.

(S15) Transmission of Display Data

The transmission and reception unit 521 of the management server 50 transmits the display data generated in step S14 to the user terminal 60. The transmission and reception unit 622 of the user terminal 60 receives the display data from the management server 50.

(S16) Display Control

The display control unit 623 of the user terminal 60 causes the display device 1007 to display various screens, items, and the like corresponding to the display data based on the display data received in step S15. A part of the display data may be generated by the user terminal 60.

(5) Screen

Various screens displayed by the user terminal 60 according to the present embodiment will be described with reference to FIGS. 9 to 12. The display data for displaying these various screens may include, for example, the display data generated by the management server 50 in step S14 described above and the display data generated by the user terminal 60. Further, these various screens may be displayed on the display device 1007 by the display control unit 623 of the user terminal 60 in step S16 or the like described above based on the display data. More specifically, these various screens may be displayed as, for example, a screen on an application for managing the reinforcing bar binding machine 10, which is installed in the user terminal 60, or a screen in a portal site for managing the reinforcing bar binding machine 10 which is provided to the user terminal 60 by the management server 50.

(5-1) Position Information Screen

Figure 9:
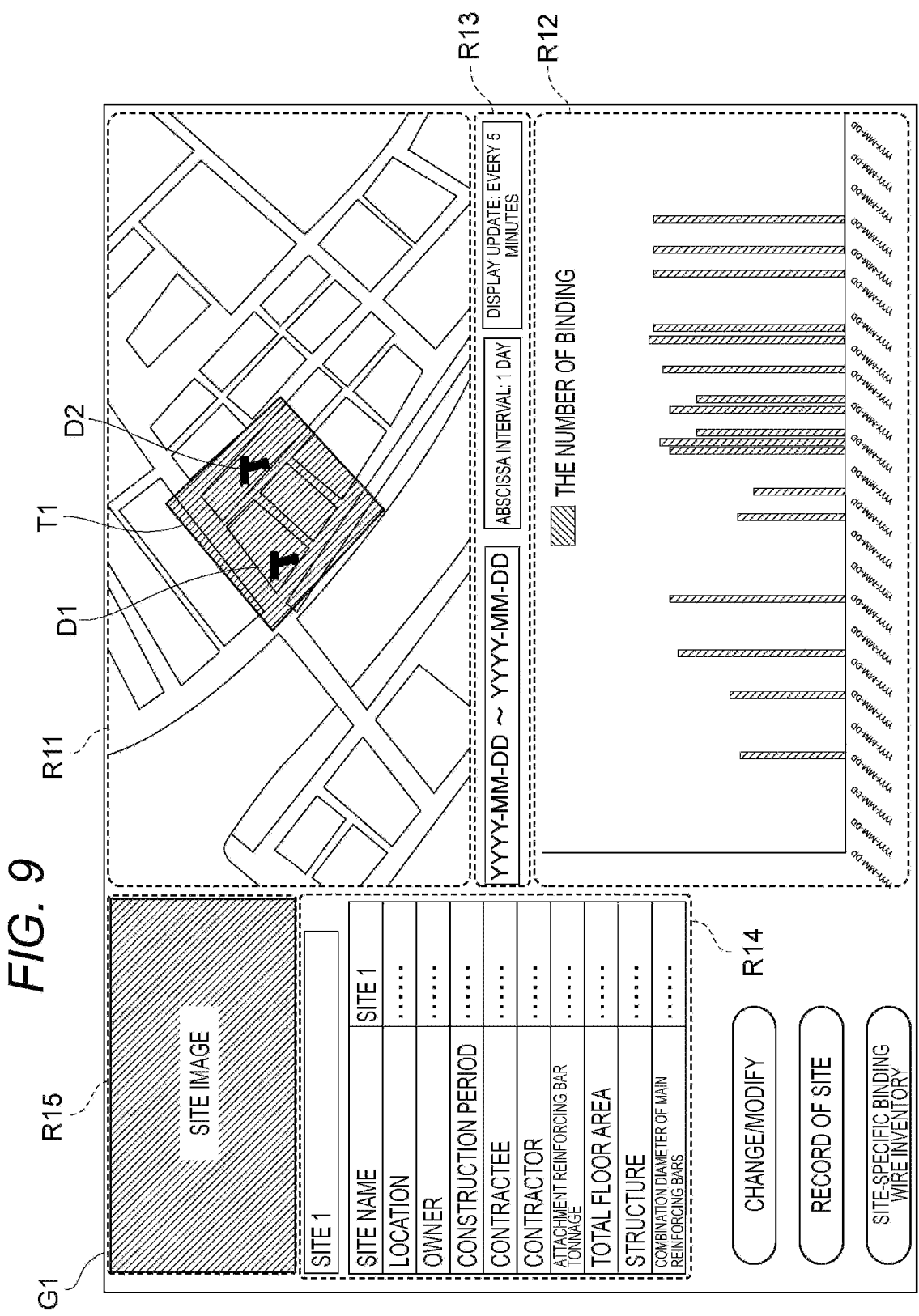
FIG. 9 is a diagram illustrating an example of a position information screen according to the present embodiment.

FIG. 9 is a diagram illustrating an example of the position information screen according to the present embodiment. The position information screen is, for example, a diagram displaying the position information and the like of the reinforcing bar binding machine 10. FIG. 9 illustrates a screen G1 as an example of the position information screen. The screen G1 includes, for example, regions R11 to R15.

A map is displayed in the region R11. For example, the map may be displayed based on map data stored in the storage unit 61 of the user terminal 60 in advance, or may be displayed based on the map data acquired from an outside of the management server 50 or the like by the user terminal 60. The user can specify a desired region (designation region) in the region R11 by operating the user terminal 60. The designation region may be a region for displaying the work information of the reinforcing bar binding machine 10 in the designation region. In FIG. 9, as an example, a quadrangular designation region T1 is shown. A shape of the designation region is not particularly limited, and may include, for example, a circle (including an ellipse), a quadrangle (square, rectangle, or the like), or a polygon. The user can define a desired region on the map of the region R11 by designating a center position, a radius, and the like in a circle, and designating a vertex position or the like in a quadrangle or a polygon.

An object such as an icon associated with the reinforcing bar binding machine 10 at the position may be displayed at any position inside or outside the designation region T1. In particular, in FIG. 9, as an example, two icons D1 and D2 respectively associated with the specific reinforcing bar binding machines 10 are displayed in the designation region T1. By selecting the icon (clicking or superimposing a cursor on the icon), various kinds of information (tool information, work information, and the like) related to the reinforcing bar binding machine 10 corresponding to the icon may be displayed in a form of, for example, a pop-up. Further, by selecting the icon, the screen may transition to a screen for displaying details of the work information and the like relating to the reinforcing bar binding machine 10 corresponding to the icon. As an object corresponding to the reinforcing bar binding machine 10, for example, when the accuracy of the position information is low, a prediction circle having a relatively large area may be displayed. A movement trajectory and a moving average (average of a speed, average of acceleration, or the like) of the reinforcing bar binding machine 10 may be displayed in the region R11 or the designation region T1 based on the position information of the reinforcing bar binding machine 10. A display of the reinforcing bar binding machine 10 (display of the object or the like corresponding to the reinforcing bar binding machine 10) may be filterable based on, for example, the position information of the reinforcing bar binding machine 10. For example, the display may be filterable based on the speed of the reinforcing bar binding machine 10 calculated from the satellite information, or may be filterable according to a type of a satellite used for generating the position information.

In the region R12, the work information of the reinforcing bar binding machine 10 in the region R11 or the designation region T1 is illustrated. In particular, in the region R12, as the work information, the number of binding obtained by summing up the actuation information of all the reinforcing bar binding machines 10 in any designation region such as the designation region T1 may be displayed. In FIG. 9, as an example, the total number of binding for each date is shown in the region R12 in a graph. The graph may indicate the number of binding of one reinforcing bar binding machine 10, or may correspond to the total number of binding performed by two or more reinforcing bar binding machines 10 (in particular, all the reinforcing bar binding machines 10 in the designation region T1). In the region R13, various setting values of the graph displayed in the region R12 are shown. The setting values are not particularly limited, and may include, for example, a display period of the graph, a unit of abscissa, and an update frequency.

In the region R14, the site information related to the site in the designation region T1 is illustrated. The site information may be information in the site information DB 515 managed by the management server 50. FIG. 9 illustrates, as an example, information such as a site name, a location, an owner, a construction period, and a contractee. In the region R15, an image of the site in the designation region T1 is illustrated. The image may be acquired from, for example, the site information DB 515 managed by the management server 50.

(5-2) Work Information Screen

FIG. 10 is a diagram illustrating an example of the work information screen according to the present embodiment. The work information screen is, for example, a screen for displaying the work information and the like of the reinforcing bar binding machine 10. FIG. 10 illustrates a screen G2 as an example of the work information screen. The screen G2 includes, for example, regions R21 to R27.

In the region R21, for example, the name of the site designated by the user is illustrated. Various pieces of information of the reinforcing bar binding machine 10 (which may include the reinforcing bar binding machine 10 freely associated by the user in addition to the reinforcing bar binding machine 10 of which a current and/or past position information is included in the site) associated with the site are displayed below the region R21. Specifically, the region R22 indicates a machine nickname of the reinforcing bar binding machine 10 that can be freely set by the user. The region R22 is not limited to the machine nickname, and a model name, a manufacturing number, or the like may be displayed.

The region R23 includes, for example, the work information. In FIG. 10, as an example, "the number of binding for today", "the number of binding in this week", and "the number of binding at this site" are illustrated. "The number of binding for today" indicates the number of binding on the current day of each reinforcing bar binding machine 10, "the number of binding in this week" indicates the number of binding in a week including the current day of each reinforcing bar binding machine 10, and "the number of binding at this site" indicates a total number of binding at the site of each reinforcing bar binding machine 10. A display mode of each binding number may be a numerical value or an object such as a bar graph. Further, color coding or the like may be performed according to the number of binding or the like.

In the region R24, for example, information related to the most recent error is illustrated. The information may relate to an error related to the consumable item such as the wire W or an error related to an operation such as an overdischarge. The model name is shown in the region R25. The model name may be a product number, a model number, or the like, or may be a manufacturing number unique to an individual. In the region R26, information related to a current status is shown. The information may be extracted from, for example, the tool information DB 512, and may be, for example, information indicating whether the machine is working. An "announcement" is, for example, notification information to the user related to each reinforcing bar binding machine 10. The information may be information freely generated by the management server 50 or the user terminal 60, and may be related to, for example, an abnormality, an error, a consumable item (such as the wire W) of the reinforcing bar binding machine 10, or the like.

(5-3) Machine Management Screen

Figure 11:
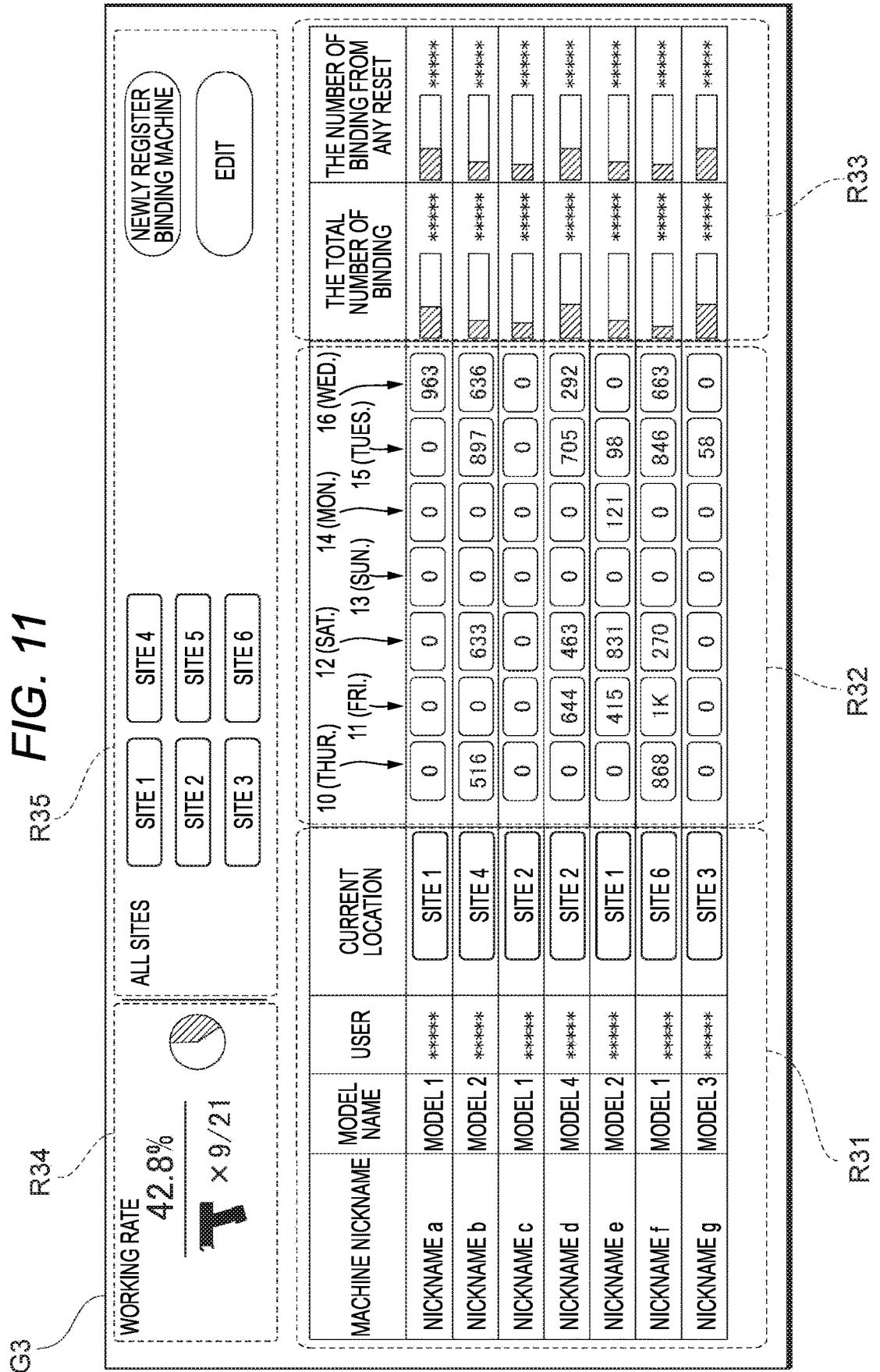
FIG. 11 is a diagram illustrating an example of a machine management screen according to the present embodiment.

FIG. 11 is a diagram illustrating an example of the machine management screen according to the present embodiment. The machine management screen is, for example, a screen for managing the reinforcing bar binding machines 10 that are owned. FIG. 11 illustrates a screen G3 as the example of the machine management screen. The screen G3 includes, for example, regions R31 to R35.

In the region R31, the machine nickname, the model name, the user, a current location, and the like of the reinforcing bar binding machine 10 are illustrated. In a column of the current location, the name of the site may be illustrated, or the position information may be illustrated. The region R31 may include other information related to the reinforcing bar binding machine 10 (for example, information extracted from the tool information DB 512).

The work information of the reinforcing bar binding machine 10 is displayed in the region R32. In particular, as shown in FIG. 11, in the region R32, a plurality of dates are shown, and cells indicating the number of binding corresponding to each reinforcing bar binding machine 10 are shown below the dates. As shown in FIG. 11, display modes of the cells corresponding to dates may have different colors, size, shape, or the like according to the number of binding.

In the region R33, the total number of binding of each of the reinforcing bar binding machines 10 is shown. In particular, in FIG. 11, the total number of binding is indicated on a left side of the region R33, and the total number of binding from any reset time point is shown on a right side of the region R33. The display mode of the number of binding may be a numerical value or a bar shape as shown in FIG. 11. Further, the reinforcing bar binding machines 10 may be sorted in an order of the number of binding (ascending order or descending order).

A working rate is shown in the region R34. Here, the working rate is, for example, a ratio of the number of reinforcing bar binding machines 10 which are currently working to the total number of reinforcing bar binding machines 10 owned by the user. In FIG. 11, as an example, the total number of reinforcing bar binding machines 10 owned by the user is 21, and a fraction notation of "9/21", a percentage notation of "42.8%", and a pie chart corresponding to the working rate are included as the working rate indicating the case in which nine of the reinforcing bar binding machines 10 are working.

In the region R35, the names of the sites where the reinforcing bar binding machines 10 owned by the users are present are shown. Further, the objects corresponding to the names of the sites may be colored for each site. A selection portion for newly registers the reinforcing bar binding machine 10 and a selection portion for editing information on the present reinforcing bar binding machines 10 are shown on a right side of the region R35.

(5-4) Site Management Screen

Figure 12:
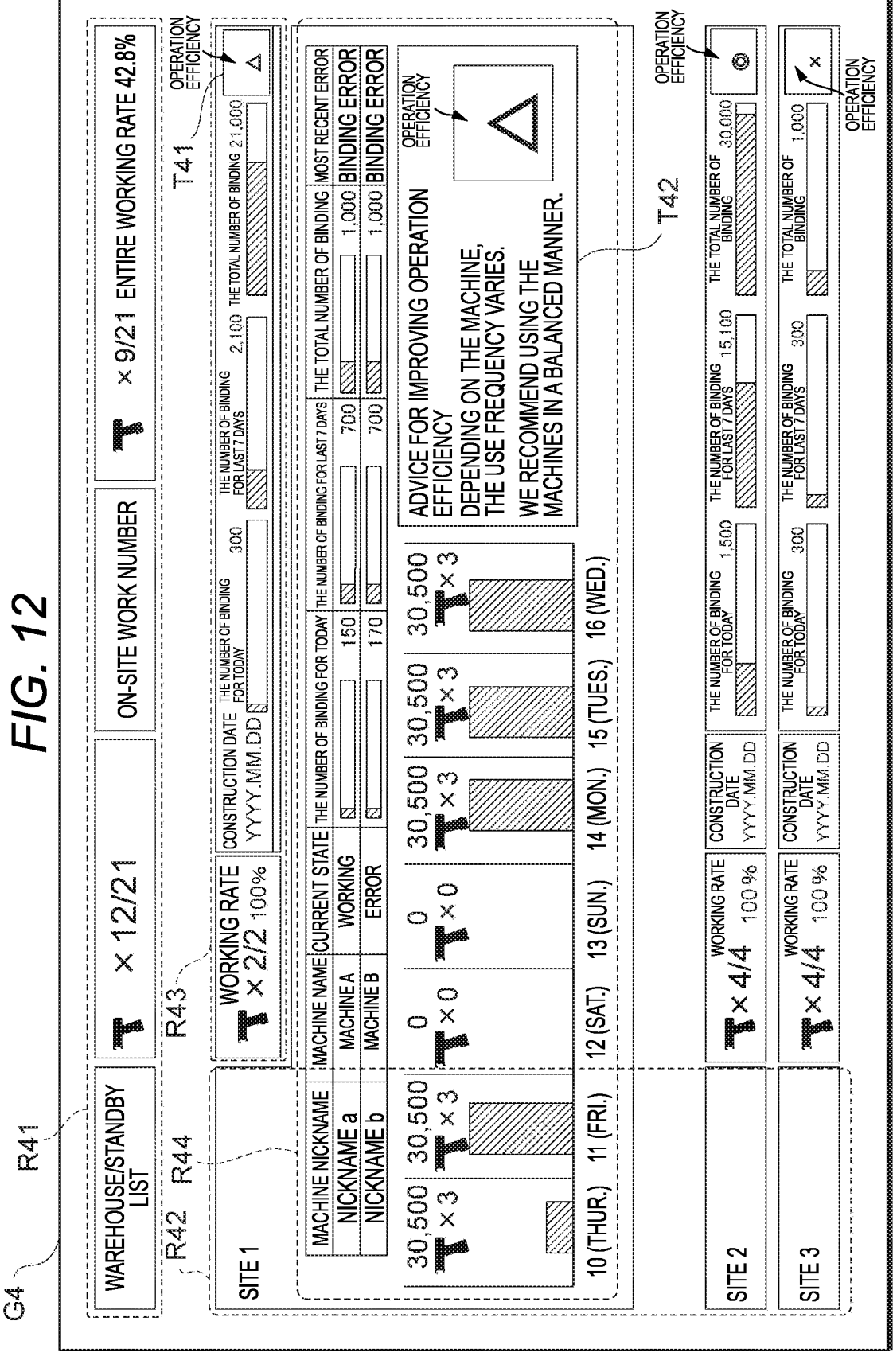
FIG. 12 is a diagram illustrating an example of a site management screen according to the present embodiment.

FIG. 12 is a diagram illustrating an example of the site management screen according to the present embodiment. The site management screen is, for example, a screen for managing the site where the reinforcing bar binding machine 10 is used. FIG. 12 illustrates a screen G4 as an example of the site management screen. The screen G4 includes, for example, regions R41 to R44.

In the region R41, a "warehouse/standby list" and "on-site work number" are illustrated. In the "warehouse/standby list", the ratio of the number of reinforcing bar binding machines 10 that are not currently working to the reinforcing bar binding machines 10 owned by the user is displayed. In FIG. 12, as an example, the total number of the reinforcing bar binding machines 10 owned by the user is 21, and a fraction notation of "¹²⁄₂₁" is included as the working rate indicating that 12 of the reinforcing bar binding machines 10 are not working. Further, the "on-site work number" is the ratio of the number of the reinforcing bar binding machines 10 which are currently working to the total number of the reinforcing bar binding machines 10 owned by the user. In FIG. 12, as an example, the total number of reinforcing bar binding machines 10 owned by the user is 21, and a fraction notation of "⁹⁄₂₁" or a percentage notation of "42.8%" is included as the working rate indicating that nine of the reinforcing bar binding machines 10 are working.

In the region R42, names of a plurality of sites are shown. In the site management screen, for example, the site information related to the site may be displayed on a right side of the name of each site by a simple display as illustrated in region R43. In the simple display of the region R43, the working rate of the reinforcing bar binding machines 10 allocated to the site, the number of binding (the number of binding for today, the number of binding for the last 7 days, the total number of binding), and the like are shown. Further, in the region R43, as indicated by a reference sign T41, operation efficiency (in the example of FIG. 12, an index obtained by evaluating variation in use frequency of each reinforcing bar binding machine 10) is shown. The site management screen is not limited to the operation efficiency, and may include other efficiency. Specifically, the site management screen may include (a) the efficiency related to the working of the reinforcing bar binding machine 10, (b) the efficiency related to the allocation of the reinforcing bar binding machine 10 to the worker, (c) the efficiency related to the progress of the process using the reinforcing bar binding machine 10, and the like. Further, when any site is selected on the site management screen, a detailed display of the site information as shown in the region R44 may be expanded. In the example illustrated in FIG. 12, the region R44 includes the machine nickname, the model name, a current state, the number of binding (the number of binding for today, the number of binding for the last 7 days, the total number of binding, and the like), the most recent error, and the like of the reinforcing bar binding machine 10. Further, the region R44 includes a predetermined proposal T42. The proposal T42 may include various pieces of advice related to use of the reinforcing bar binding machine 10. In the example illustrated in FIG. 12, as the "advice for improving the operation efficiency", a proposal to prevent the variation in use frequency of each reinforcing bar binding machine 10 is included. The content of the proposal is not limited thereto, and may include, for example, a proposal related to the working of the reinforcing bar binding machine 10, a proposal related to the assignment of the reinforcing bar binding machine 10 to the worker, a proposal related to the progress of the process of using the reinforcing bar binding machine 10, and the like. Further, the proposal may include, for example, a proposal of rearrangement of the reinforcing bar binding machine 10 to the site, and a proposal of maintenance of the reinforcing bar binding machine 10.

The embodiments described above are intended to facilitate the understanding of the present invention, and are not intended to limit the present invention. The components provided in the embodiment and arrangements, materials, conditions, shapes, sizes, and the like thereof are not limited to those illustrated above, and can be appropriately changed. Further, configurations described in different embodiments may be partially substituted or combined.

What is claimed is:

1. An information processing apparatus comprising processing circuitry configured to:

acquire, from each of a plurality of electric power tools, position information of each of the plurality of electric power tools and actuation information indicating that each of the plurality of electric power tools is actuated;

generate work information indicating a work status of each of the plurality of electric power tools based on the actuation information, the work status including an actuation history of each of the plurality of electric power tools;

receive designation of a region;

extract, from among the plurality of electric power tools, at least one electric power tool of which the position information is included in the designated region;

generate the work information by aggregating the actuation information from the extracted electric power tools;

generate display data for causing a display device to display the work information of the extracted electric power tools, wherein the generated display data includes a numerical or graphical representation showing comparative work information for the extracted electric power tools; and output the display data, whereby, based on the work information generated by the processing circuitry, a desired state associated with the at least one electric power tool is maintained.

2. The information processing apparatus according to claim 1, wherein the processing circuitry is configured to receive designation of a shape defining the region.

3. The information processing apparatus according to claim 2, wherein the shape is a circle, a quadrangle, or a polygon.

4. The information processing apparatus according to claim 1, wherein the position information includes information indicating an elevation of each of the plurality of electric power tools, and the designated region includes designation of the elevation.

5. The information processing apparatus according to claim 1, wherein the processing circuitry is further configured to calculate an index indicating a predetermined efficiency based on the work information, wherein the display data includes display data for causing the display device to display the index indicating the predetermined efficiency.

6. The information processing apparatus according to claim 5, wherein the predetermined efficiency includes at least one of: efficiency related to working of the plurality of electric power tools, efficiency related to allocation of the plurality of electric power tools to a plurality of workers, or efficiency related to progress of a process using the plurality of electric power tools.

7. The information processing apparatus according to claim 5, wherein the processing circuitry is further configured to generate a proposal related to the plurality of electric power tools based on the predetermined efficiency.

8. The information processing apparatus according to claim 1, wherein the processing circuitry is further configured to:

receive designation of a site; and acquire site information associated with the designated site, wherein the display data is display data for causing the display device to display the work information of the extracted electric power tool and the acquired site information.

9. An information processing method implemented by one or more computer, the method comprising steps of:

acquiring, from each of a plurality of electric power tools, position information of each of the plurality of electric power tools and actuation information indicating that each of the plurality of electric power tools is actuated;

generating work information indicating a work status of each of the plurality of electric power tools based on the actuation information, the work status including a actuation history of each of the plurality of electric power tools;

receiving designation of a region;

extracting, from among the plurality of electric power tools, at least one electric power tool of which the position information is included in the designated region;

generating the work information by aggregating the actuation information from the extracted electric power tools;

generating display data for causing a display device to display the work information of the extracted electric power tools, wherein the generated display data includes a numerical or graphical representation showing comparative work information for the extracted electric power tools; and outputting the display data, whereby, based on the generated work information, a desired state associated with the at least one electric power tool is maintained.

10. A non-transitory computer-readable storage medium storing a program for causing a computer to execute the method according to claim 9.

11. The information processing apparatus of claim 1, wherein the work information includes a number of actuations of the electric power tool obtained by summing the actuation information in a predetermined period.

12. The information processing apparatus of claim 1, wherein the work information is at least one of: a number of actuations on a work day of the electric power tool, a number of actuations in a week including the work day, or a cumulative number of actuations at a site where work is performed.

13. The information processing apparatus of claim 1, wherein the processing circuitry is further configured to:

receive designation of a site; and acquire site information associated with the designated site, wherein the site information is at least one of: a site name, a site address, site location, an owner, a construction period, or a contractee.

14. The information processing apparatus of claim 1, wherein the processing circuitry is further configured to:

acquire an actuation time at which the electric power tool is actuated and a reception time at which the actuation time is received; and determine a communication state based on a time lag between the actuation time and the reception time.

15. The information processing apparatus of claim 1, wherein the electric power tool is a reinforcing bar binding machine that can bind reinforcing bars with wire, and the work information is a number of bindings obtained by summing the actuation information of the reinforcing bar binding machine.

* * * * *